United States Patent
Freilich et al.

(10) Patent No.: US 11,649,107 B2
(45) Date of Patent: *May 16, 2023

(54) CONTAINER FOR FLOWERS AND METHOD OF OPERATION THEREOF

(71) Applicants: David Freilich, Englewood, NJ (US); Elisa Freilich, Englewood, NJ (US)

(72) Inventors: David Freilich, Englewood, NJ (US); Elisa Freilich, Englewood, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/644,814

(22) Filed: Dec. 17, 2021

(65) Prior Publication Data
US 2022/0119192 A1    Apr. 21, 2022

Related U.S. Application Data

(63) Continuation of application No. 16/564,041, filed on Sep. 9, 2019, now Pat. No. 11,214,434.

(60) Provisional application No. 62/817,917, filed on Mar. 13, 2019.

(51) Int. Cl.
    *B65D 85/50*     (2006.01)
    *A47G 7/02*     (2006.01)

(52) U.S. Cl.
    CPC ............. *B65D 85/505* (2013.01); *A47G 7/02* (2013.01)

(58) Field of Classification Search
    CPC .......... A01G 5/00; A47G 7/00; A47G 7/0078; A47G 7/02; A47G 7/03; B65D 85/50; B65D 85/505; B65D 85/52
    See application file for complete search history.

(56) References Cited

U.S. PATENT DOCUMENTS

| | | | | |
|---|---|---|---|---|
| 5,758,472 | A * | 6/1998 | Weder | B65B 25/026 53/399 |
| 6,305,540 | B1 * | 10/2001 | Crawford | A45C 13/02 206/320 |
| 9,096,366 | B2 * | 8/2015 | Sabogal | B65D 85/505 |
| 9,359,125 | B2 * | 6/2016 | Pavlu, Jr. | B65D 85/505 |
| 2005/0150802 | A1 * | 7/2005 | Davies | B65D 81/365 206/457 |

* cited by examiner

*Primary Examiner* — Bryon P Gehman
(74) *Attorney, Agent, or Firm* — Zaretsky Group PC; Howard Zaretsky

(57) ABSTRACT

Disclosed is a container suitable for holding objects such as flowers and which may include a body having at least one wall defining a cavity. The at least one wall may include openings separated apart from each other. A tensioner may pass through the openings. A platform may be situated within the cavity and coupled to the tensioner so as to receive a force from the tensioner when a tension is applied to the tensioner. This force may be operative to lift the platform and the flower coupled thereto so that the flower partially or fully extends from the cavity while at least a portion of the platform remains in the cavity.

19 Claims, 22 Drawing Sheets

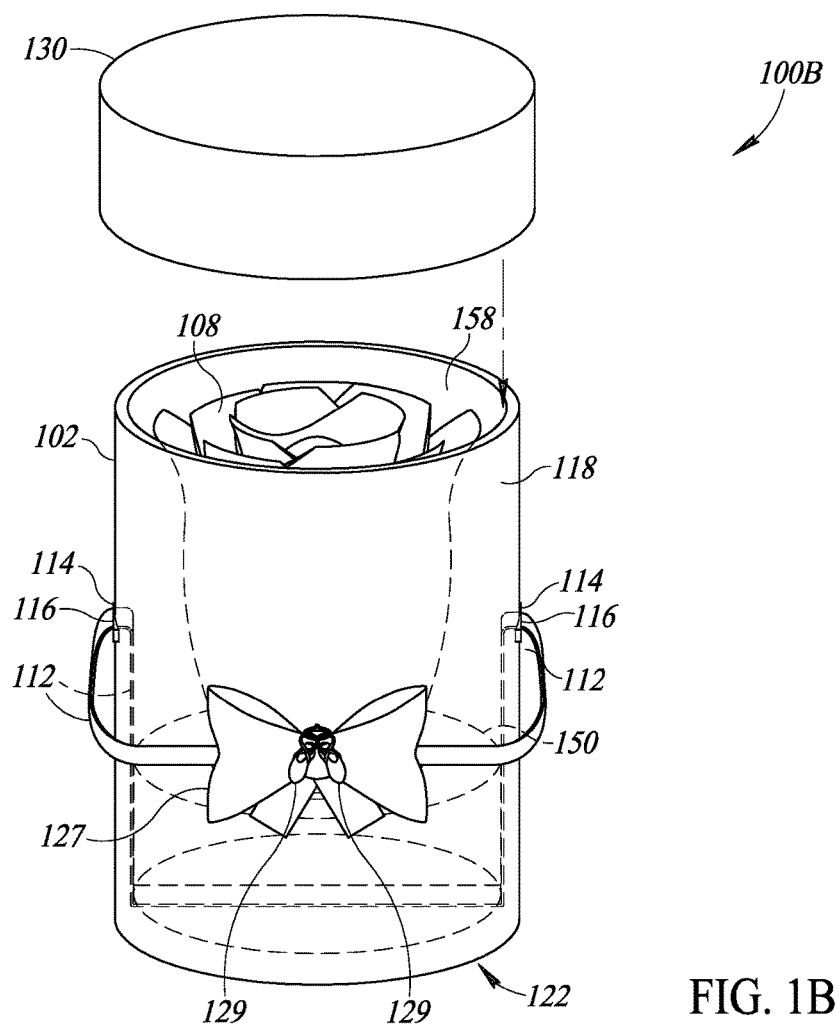
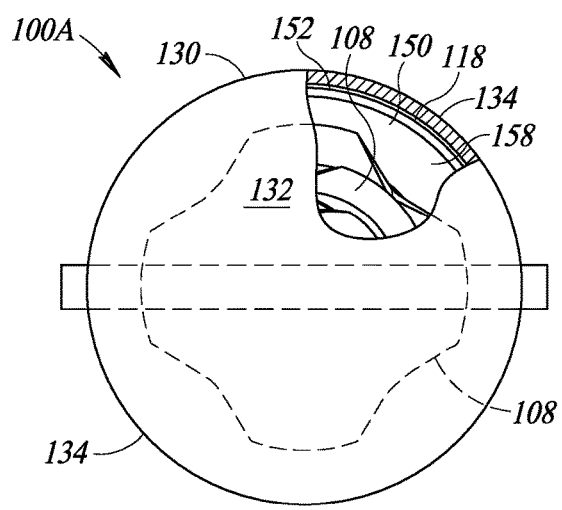
FIG. 2
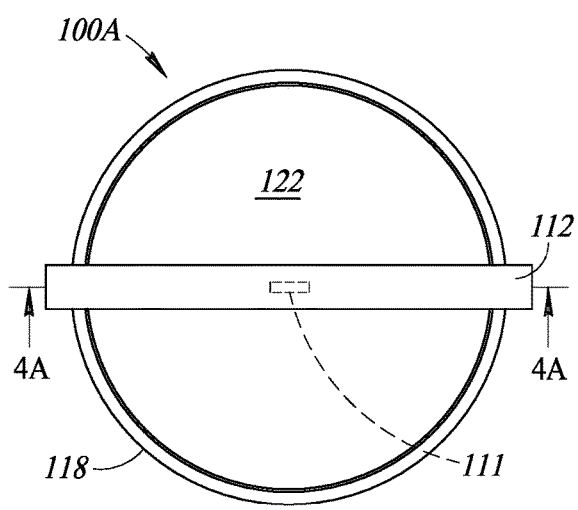
FIG. 3
FIG. 1B

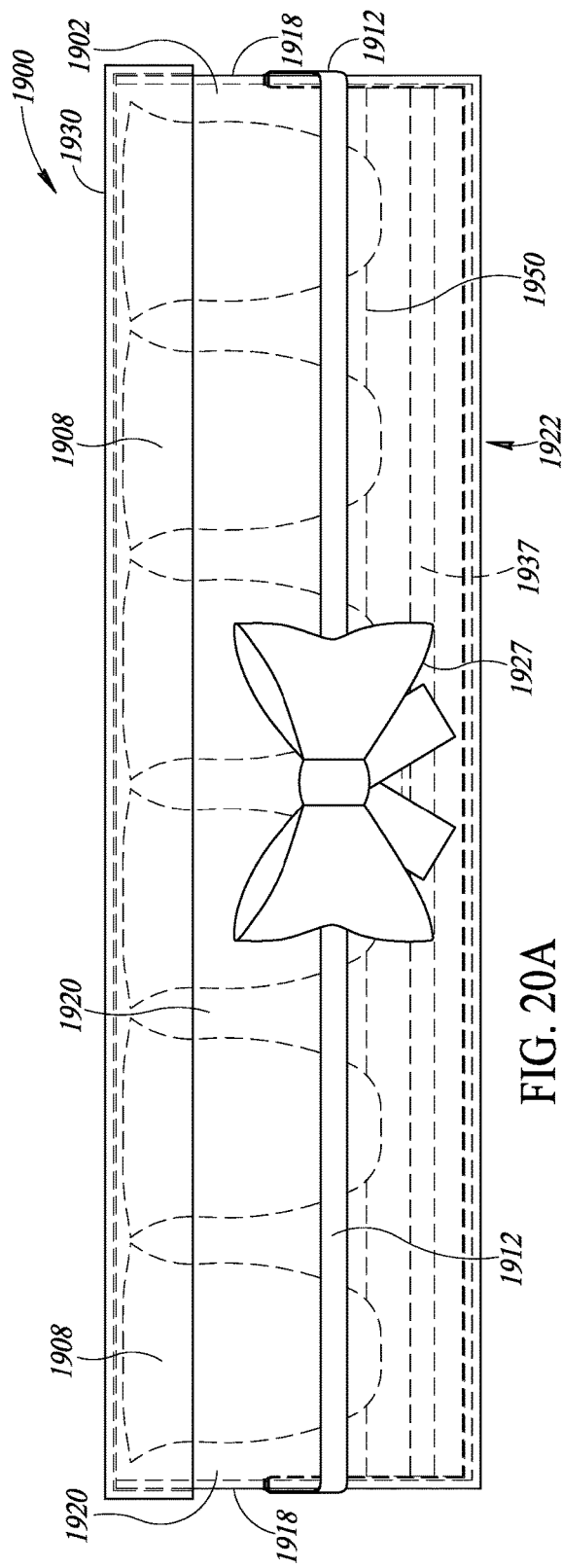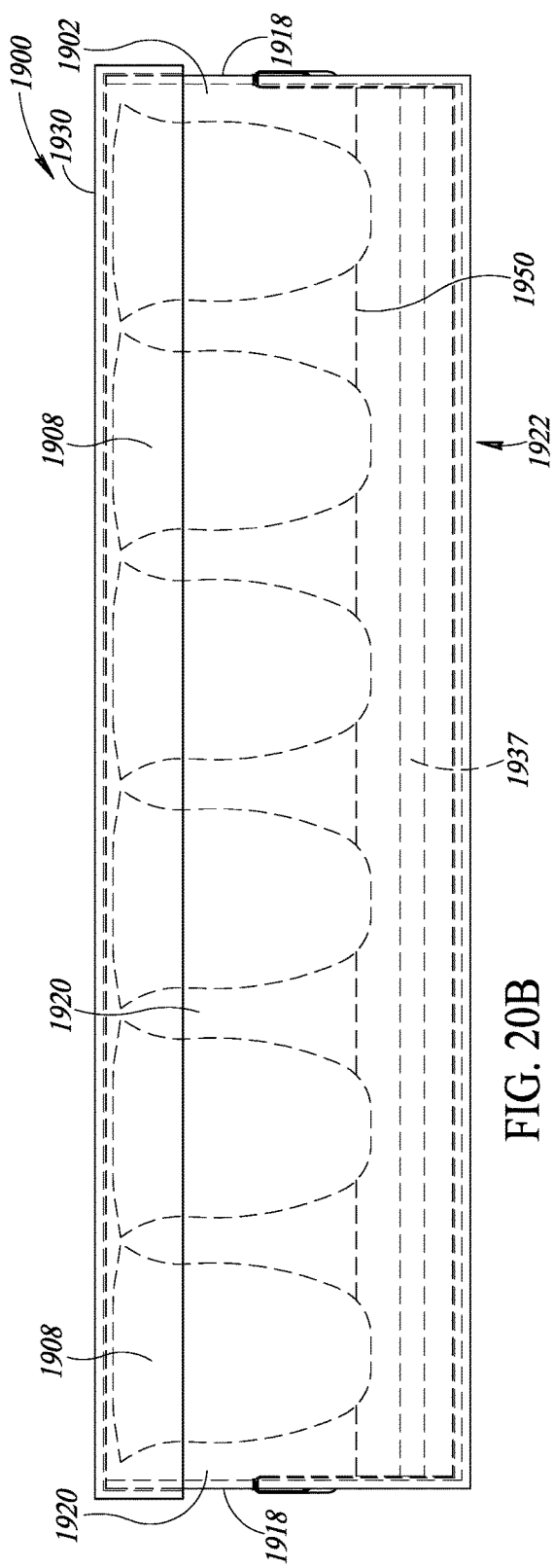
FIG. 20A
FIG. 20B

CONTAINER FOR FLOWERS AND METHOD OF OPERATION THEREOF

REFERENCE TO PRIORITY APPLICATION

This application is a continuation of U.S. application Ser. No. 16/564,041, filed Sep. 9, 2019, entitled "Container for Flowers and Method of Operation Thereof," which claims priority to U.S. Provisional Application No. 62/817,917, filed Mar. 13, 2019, entitled "Container for Flowers and Method of Operation Thereof," the contents of all of which are incorporated herein by reference in their entirety.

FIELD OF THE DISCLOSURE

The present system relates to a container for flowers and, more particularly, to a container system for flowers with an interchangeable and elevatable platform for positioning at least one flower and a system of operation thereof.

BACKROUND OF THE INVENTION

Flowers are typically given as a gift and may be wrapped in a cellophane or paper wrapper or enclosed in a container such as a box typically made from cardboard or the like. Wrapped flowers may be easily bruised, damaged, and/or difficult to ship economically. Boxed flowers may protect the flower contained within but may be bulky and drab and not particularly attractive or aesthetically pleasing to a recipient. After flowers are removed from their conventional wrapping, they must be promptly placed in a liquid such as water to enhance their appearance and extend their useful life. This may require a recipient of the flower to perform additional tasks and may result in a lower price for the flower. Moreover, this may require a user have a vase or the like ready for receiving the flower. Accordingly, the present system and methods overcome these deficiencies of the above-mentioned prior art systems.

SUMMARY OF THE INVENTION

The systems, devices, methods, user interfaces, arrangements, computer programs, processes, etc. (hereinafter each of which will be referred to as system, unless the context indicates otherwise), described herein address and/or overcome problems in prior art systems.

In accordance with embodiments of the present system, there is disclosed a container suitable for holding objects such as flowers and which may include a body having at least one wall defining a cavity. The at least one wall may include openings separated apart from each other. A tensioner (e.g., an operating member) may pass through the openings. A platform may be situated within the cavity and coupled to the tensioner so as to receive a force from the tensioner when a tension is applied to the tensioner. This force may be operative to lift the platform and the flower coupled thereto so that the flower partially or fully extends from the cavity while at least a portion of the platform remains in the cavity.

In accordance with embodiments of the present system, there is disclosed a container which may include one or more of a flexible tensioner; a platform may be configured to be coupled to the tensioner and at least one flower; and/or a body may include at least one wall which may define at least a portion of a cavity that may be configured to receive the platform, and a first opening leading to the cavity; a plurality of opposed openings may be situated in the at least one wall and may be configured to receive the tensioner such that a portion of the tensioner may extend through the plurality of openings and may be situated in the cavity.

It is envisioned that the tensioner may be coupled to the platform to form a loop therewith. A portion of the of the loop may be situated in the cavity and a portion of the loop may be situated outside of the cavity. It is further envisioned that at least one coupler may be configured to secure the at least one flower to the platform. In accordance with embodiments of the present system, the platform may be configured to telescopically travel within the cavity and may be held in a desired position relative to the body using an interference fit. The container may further include at least one flower. It is envisioned that this flower may include a real flower, a preserved flower, and/or an artificial flower and/or combinations thereof. Flowers of varying types, colors, hues, and/or sizes may be provided. Flowers of different colors may form a desired pattern such as a textual pattern and/or a graphical pattern.

In accordance with embodiments of the present system, it is envisioned that at least one bead may be coupled to the tensioner. It is further envisioned that the tensioner may be configured to lift the platform when tensioned across the cavity. The container may further include a container such as ring container which may be coupled to at least one of the platform and the at least one flower. The container may include a cavity suitable for containing a desired object such as a piece of jewelry (e.g., a ring, an earing(s), a necklace, a bracelet, etc.) It is envisioned that least one bow may be coupled to the tensioner. It is further envisioned that at least one charm may be coupled to the at least one bow or to the tensioner. In accordance with embodiments of the present system, at least one of a cover and an inner cover may be configured to cover at least a portion of the cavity.

In accordance with embodiments of the present system, there is provided a container which may include: a platform configured to be coupled to a tensioner and at least one flower; a body having at least one wall extending between top and bottom edges and defining at least a portion of a cavity configured to receive the platform, the top edges defining a first opening leading to the cavity; a plurality of opposed openings situated in the at least one wall between the top and bottom edges; and/or a tensioner extending through the opposed openings such that at least a portion of the tensioner is situated in the cavity.

It is envisioned that the tensioner may be fixedly or slidably coupled to the platform. A coupler may be provided to couple the tensioner into a loop. At least one coupler may be provided and may be configured to secure the at least one flower to the platform. It is envisioned that the platform may be configured to telescopically travel within the cavity. It is envisioned that the at least one flower may include a real flower, an artificial, and/or a preserved flower and/or combinations thereof. It is further envisioned that at least one tab suitable for grasping by a user or at least one bead may be coupled to the tensioner.

In accordance with embodiments of the present system, there may be provided a ring container coupled to at least one of the platform and the at least one flower. At least one bow may be provided and may be coupled to the tensioner. It is envisioned that at least one charm may be coupled to at least one of the tensioner and the at least one bow. It is also envisioned that at least one of a cover and an inner cover each of which may be configured to cover at least a portion of the cavity may be provided.

In accordance with embodiments of the present system, there is provided a container which may include: a platform configured to be coupled to at least one flower; a body having at least one wall extending between top and bottom edges and which may define at least a portion of a cavity which may be configured to receive the platform, the top edge which may define a first opening leading to the cavity, the body may further include a bottom wall at the bottom edge; at least one opening situated in the at least one wall between the top and bottom edges; and/or a tensioner which may extend across the cavity and through the at least one opening such that the tensioner may be configured to be pulled through the at least one opening.

A coupler may be provided and configured to couple at least a portion of the tensioner to the body. It is further envisioned that at least a portion of the tensioner may be situated between at least a portion of the platform and at least one of the bottom wall and the at least one wall. At least one of a cover and inner cover may be provided and may be configured to cover at least a portion of the cavity. It is envisioned that at least one of a bow and a charm may be provided and may be coupled each other and/or the tensioner. A ring container may be provided and may be coupled to at least one of the platform and the at least one flower.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 1B is a diagram illustrating a partially exploded perspective front view of a portion of an example flower container system of the present invention according to a second embodiment;

FIG. 2 is a diagram illustrating a partially cutaway top view of a portion of the system of the present invention;

FIG. 3 is a diagram illustrating a bottom view of a portion of the system of the present invention;

FIG. 20A is a diagram illustrating a front view of a portion of the system of the present invention;

FIG. 20B is a diagram illustrating a rear view of a portion of the system 1900 of the present invention;

DETAILED DESCRIPTION

Figure 1A:
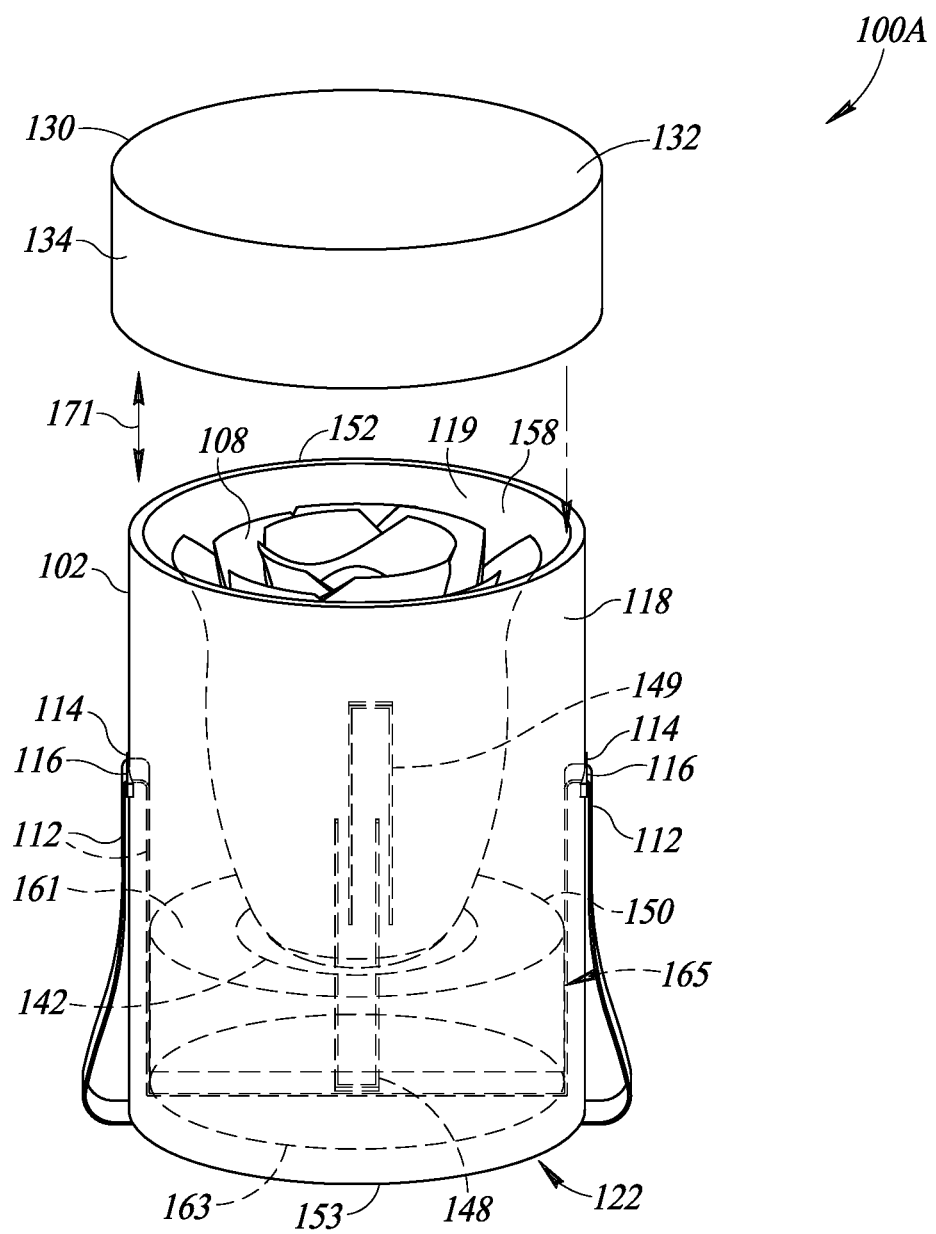
FIG. 1A is a diagram illustrating a partially exploded perspective front view of a portion of an example flower container system of the present invention according to a first embodiment.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

FIG. 1A is a diagram illustrating a partially exploded perspective front view of a portion of an example flower container system (hereinafter system 100A for the sake of clarity) of the present invention according to a first embodiment. The system 100A may include one or more of a body 102, a flower 108, a platform 150, a tensioner 112 (e.g., an operating member) and a cover 130. The rear view may be similar.

The body 102 may include one or more walls such as a side wall 118 which may extend between a top wall 152 (or top edge) and a bottom wall 153 (or bottom edge) of the side wall 118 and may define at least a portion of a cavity 158 which may be configured to receive the platform 150 and the flower 108 coupled thereto. The side wall 118 may include one or more openings such as openings 116 which may be configured to receive and or to provide passage of corresponding portions of the tensioner 112 which may pass therethrough. One or more of the openings 116 may include a grommet 114 or the like (e.g., a cringle, an eyelet, etc.) through which the tensioner 112 may pass.

The grommet 114 may include a low friction surface in contact with the tensioner so as to reduce friction between the tensioner 112 and the grommet 114. In some embodiments, it is envisioned that the grommet 114 may be configured to provide a desired amount of resistance when the tensioner 112 passes therethrough so as to provide an interference fit or the like to prevent or restrict movement of the tensioner 112 through the grommet 114 in one or more desired directions. The grommet 114 may be continuous or discontinuous about a periphery of the corresponding opening 116 and may be configured to reduce or otherwise prevent abrasion of the tensioner 112 during use. In some embodiments at least a portion of the grommet may be formed from a snap fit type grommet which may be snap fit into a corresponding opening and which may be suitable to receive the tensioner 112. In some embodiments, the grommet may be formed integrally with the side wall 118 of the body 102.

The tensioner 112 may include any suitable flexible member or members such as a ribbon, a film, a tape, a string, a braid, a cord, a rope, a cable, a chain, a band, a belt, a cable tie or the like (e.g., a zip-tie or portion thereof) and/or the like and/or combinations thereof. For example, in some embodiments it is envisioned that the tensioner 112 may be formed from a ribbon or other suitable material or materials as may be desired. It is further envisioned that the tensioner 112 may be formed from any suitable material such as polymers, plastic, cloth, metal, and/or the like and/or combinations thereof. The tensioner 112 may be configured to pass through one or more of the openings 116 and/or the grommet 114 with a desired amount of friction as may be desired. Generally, the tensioner 112 may be configured to be tensioned (e.g., by a user) in at least that portion that lies within the cavity 158 and is supported by one or more walls of the body 102 such as the side wall 118. For example, the tensioner 112 may pass through the side wall 118 at openings 116 such that the tensioner 112 may be supported by the side wall 118 at the openings 116 (e.g., via optional grommets 114). It is further envisioned that when the platform is substantially or fully recessed within the body 102, tensioner 112 may support an optional bow, charm, or the like, at a desired position relative to the side wall 118 of the body 102.

In some embodiments, the tensioner 112 may extend about and/or wrap around a portion of the body 102 and/or cover 130. For example, the tensioner 112 may extend about the bottom wall 122 of the body 102. In some embodiments, the tensioner 112 may be coupled to the platform 150 and/or body 102 using any suitable method or methods.

For example, any suitable coupler may be provided to couple the tensioner 112 to the body 102 such as an adhesive (e.g., see, 111 FIG. 3) or the like. For example, a coupler such as an adhesive or tape may releasably attach at least a portion of the tensioner 112 to the bottom wall 122 of the body 102 as may be desired. It is further envisioned that the tensioner 112 may be folded (or otherwise wrapped) and/or knotted one or more times, or may form at least a portion of a bow, as may be desired to enhance aesthetics. For example, a portion of the tensioner may be tied or otherwise configured to form a bow or other type of knot as may be desired. The knot may further restrict or prevent travel of any beads through which the tensioner 112 may pass as may be desired.

The tensioner 112 may further include one or more pull tabs suitable for grasping by a user as may be desired. For example, the one or more pull tabs may be coupled to and/or situated at a portion of the tensioner 112 that is situated at an exterior portion of the body 102.

It is envisioned that the tensioner 112 may be fixedly or slidably coupled to the platform 150. It is envisioned that when the tensioner 112 includes a cable tie or the like (e.g., a ribbon with teeth, etc.) or a portion thereof (e.g., a flexible toothed ribbon), one or more of the grommets 114 may include a coupler such as a ratchet or pawl which may be configured to engage a corresponding portion of the cable tie such a tooth and lock the cable tie in a desired position relative to the grommet 114. This may lock the platform 150 attached to the tensioner 112 in a desired position (e.g., fully or partially raised, etc.). It is envisioned that the tensioner 112 may be configured to engage the ratchet or pawl of the grommet 114.

In accordance with some embodiments it is envisioned that the tensioner may pass through openings of one or more beads. Thus, one or more portions of the tensioner 112 may include beads (e.g., be beaded). For example, one or more portions of the tensioner 112 that may be situated outside of the cavity 158 may include beads or be beaded (e.g., using pearls, stone beads, glass beads, and/or the like). It is also envisioned that the tensioner 112 may pass through on or more charms including openings through which the tensioner 112 may pass. The tensioner 112 may be knotted on one or both sides of the beads to lock the beads into a desired position relative to the tensioner 112. The beads may include natural beads (e.g., pearls, gems, stones, glass, etc.) and/or artificial beads (e.g., plastic, glass, epoxy, synthetic, etc.). Each of the beads may include an opening through which the tensioner may pass so as to be coupled thereto. In some embodiments, it is envisioned that portions of the tensioner may be coupled using a clasp or the like. For example, the clasp may be coupled to one or more portions of the tensioner that may be situated outside of the cavity. It is further envisioned that the beaded portion(s) of the tensioner may form a tab suitable for a user to grasp. It is envisioned that the beads may be formed integrally with, or separately from, the tensioner 112.

The platform 150 may include one or more receiving areas to receive the flower 102 such as a well 142, an opening, a notch, a cutout, and/or the like configured to receive and/or position at least a portion the flower 108. The platform 150 may further include couplers such as slots or openings in which a desired object such as a piece of jewelry, a jewelry box, an ornament, and/or the like, may be inserted. Accordingly, one or more pieces of jewelry (e.g. an engagement ring) may be coupled to the platform 150. For example, a ring may be coupled to the platform 150 adjacent to the flower 108 as may be desired.

An optional coupler 140 may be provided to couple the flower 108 to the platform 150 using any suitable method. For example, the optional coupler 140 may include one or more of an adhesive (e.g., see 146, FIG. 4A), one or more staples (148, 149), a nail, a pin, a tape, a string, a ribbon, and/or the like or other suitable fasteners which may be provided to couple at least a portion of the flower 108 to the platform 150 for use. With regard to the receiving areas, these areas may include a well which may be configured to receive, position, and/or stabilize, at least a portion of the flower 108. With regard to the adhesive, this adhesive may be selected such that it may be compatible for use with the flower 108 and/or a material of the platform 150.

The platform 150 may be formed from any suitable material such as a foam (e.g., floral foam and/or the like), cardboard, polymers, plastic, and/or the like, and/or combinations thereof. A rigidity enhancing member may be situated within, or attached to, the platform 150 to increase rigidity of the platform 150. In accordance with some embodiments, the adhesive may be optional and may provide a sufficient bond to couple the flower 108 to the platform 150. It is further envisioned that an orientation of one or more of the staples 148 and 149 may be positioned in an orientation other than vertical as shown.

The platform 150 may be shaped and/or sized such that it may be slidably received within the cavity 158 and may include one or more of a top wall 161, a bottom wall, and a side wall. The top wall may be configured to receive the flower 108. For example, the top wall 161 may include the receiving area such as an opening or the well 142 to receive the flower 108. During use, the platform 150 may telescope relative to one or more portions of the body 102 such as an interior portion 119 of the side wall 118 as illustrated by arrow 171.

The flower 108 may include one or more flowers and may include a natural flower which may be preserved, if desired, using any suitable preservation method or methods. However, it is also envisioned that one or more of the flowers 108 may include an artificial flower.

Although only a single flower 108 is shown, it is envisioned that a plurality of flowers of the same or of different types, species, varieties, parts and/or portions thereof may be provided. For example, the flower 108 may include any suitable flower such as a rose, a rose bud, a marigold, etc. Thus, it is envisioned that the flower 108 may include portions of any suitable plant(s) and/or flowers thereof. For example, a rose or rose bud is shown.

In some embodiments, the flower 108 may include other portions of a corresponding plant such as leaves (e.g., the leaflets), stems, hips, etc., as may be desired. For example, if the flower 108 includes a rose, it may include other portions of the rose plant such as the rose hip, stem, and/or leaflets as may be desired. Further, it is envisioned that the flower 108 may include portions of ornamental plants as may be desired with or without a flower. For example, the flower 108 may include a floral arrangement and/or an arrangement of one or more flowers, grasses, succulents, trees, brushes, and/or shrubs.

In accordance with some embodiments, it is envisioned that portions of the flower 108 such as a stem (if provided) or the like may pierce and/or be embedded in the platform 150 so as to be coupled to the platform 150. For example, ornamental stems and/or leaves may be situated about the flower 108 so as to form a floral arrangement.

The cavity 158 and/or the platform 150 may be shaped and/or sized such that a desired amount of friction may be provided to prevent undesirable movement of the platform 150 during use, storage, and/or shipping. Accordingly, friction (e.g., asperity, etc.) between the platform 150 and/or the side wall 118 (or interior portion 119 thereof) may be varied to control position and/or movement of the platform 150 relative to the body 102. This may provide for an interference fit between the platform 150 and an adjacent portion of interior portion 119 of the side wall 118 within the cavity 158. In some embodiments, it is envisioned that other portions of the system such as the tensioner 112 and the corresponding opening 116 or grommet 114 may provide a desired amount of friction to maintain a position of the platform 150.

It is envisioned that the side wall 118 may include an indentation such as a notch or protrusion such as a tab or flange or other type of embossing which may couple to a corresponding protrusion or indentation on the platform 150 so as to hold the platform 150 in a desired position relative to the body 102 such as a in a fully or substantially raised or recessed positions when desired.

It is further envisioned that a guide such as a rail, a bracket (e.g., an "L" shaped bracket, etc.), a tube, or the like may be located within the cavity 158 of the body 102 and may be configured to guide the platform 150 and/or prevent rotation of the platform 150 along one or more axes within the cavity 158 as may be desired. For example, the guide may be coupled to, and may extend along a height of side wall 118 (e.g., from the top wall 152 to the bottom wall 153 of the side wall 118) such that it extends along a path of travel of the platform 150 (e.g.; in a direction indicated by arrow 171) and may act as a guide which may guide the platform 150 as it is raised or lowered within the cavity 158. The platform 150 may include one or more corresponding areas which may be shaped and/or sized to receive the guide.

The cover 130 may be shaped and sized so as to cover at least a portion of the cavity 158 of the body 102 and may be removably attached to the body 102. The cover 130 may include one or more of a top wall 132 and at least one side wall 134. The cover 130 may be removed prior to raising the flower 108 from the cavity 158. The cover 130 may be secured to the body 102 using any suitable method or methods such as an interference fit, tabs, notches, tapes, etc.

A holding mechanism may be provided to hold the platform 150 and/or the flower 108 attached thereto in a desired position relative to the side wall 118 of the body 102 when the platform 150 is raised such as when it is in a display position (e.g., when the platform 150 is fully or substantially raised relative to the body 102). The holding mechanism may employ any suitable holding mechanism such as an interference fit (e.g., a friction fit), a latch, a detent or detents, dimples, magnetic couplers, and/or the like and/or combinations thereof. For example, the holding mechanism may employ an interference fit between adjacent portions of the platform 150 (e.g., a side wall of the platform 150) and the side wall 118 of the body 102. It is envisioned that the holding mechanism may further include one or more protrusions (e.g., dimples, studs, flanges, etc.) and/or pawls at the side wall 118 of the body 102 which may engage corresponding portions on the platform 150, and/or vice versa. For example, a protrusion in the side wall 118 of the body 102 may engage a depression or dimple in an adjacent portion of the platform 150 so as to lock the platform 150 in a desired position relative to the side wall 118 of the body 102. It should be appreciated that an interior portion of the grommet 114 may form at least a portion of a dimple or protrusion which may engage a corresponding portion of the platform 150 to hold the platform 150 in a desired position or positions relative to the body 102 as may be desired. In yet other embodiments, it is envisioned that one or more magnetic couplers may be provided to couple the platform 150 in one or more positions (e.g., fully or substantially recessed and/or raised) relative to the body 102.

In accordance with embodiments of the invention, the tensioner 112 may be configured to extend at least partially across the side wall 118 rather than the bottom wall 122 of the body 102 as illustrated with reference to FIG. 1A. This is illustrated with reference to FIG. 1B which is a diagram illustrating a partially exploded perspective front view of a portion of an example flower container system (hereinafter system 100B for the sake of clarity) of the present invention according to a second embodiment.

The system 100B may be similar to the system 100A and may include one or more of the body 102, the flower 108, the platform 150, the tensioner 112, and the cover 130 as discussed with reference to the system 100A. The tensioner 112 may be configured such that it may pass along the side wall 118 of the body 102 rather than under the bottom wall 122 of the body 102.

It is envisioned that ornamentation such as one or more of a bow, a charm, a trinket, a pendant, a ring, a buckle, and/or the like and/or combinations thereof (which may hereinafter be commonly referred to as a charm for the sake of clarity unless the context indicates otherwise) may be attached to, or formed integrally with, the tensioner 112. For example, a bow 127 may be coupled to the tensioner 112 using any suitable coupler. For example, the bow 127 may be coupled to the tensioner 112 using an adhesive (e.g., double sided tape or the like, a thermo adhesive, a magnetic coupling, etc.), a thread, a staple, an interference fit, a loop, a pin, etc.

It is envisioned that portions of the tensioner 112 may be configured to form at least a portion of the bow or the like. It is further envisioned that ornamentation may be attached to the tensioner 112 or to each other. For example, it is envisioned that a charm 129 (or charms) may be coupled to the bow 127. The charm 129 may include one or more of a ring (e.g., an engagement ring, etc.), a jewel, an animal, a letter, a name, a word, a shoe (e.g., baby shoes, etc.), a graduation cap, etc. (hereinafter each of which may be commonly referred to as a charm).

The charm 129 may be coupled to one or more portions of the tensioner 112 and/or bow 127 using any suitable method such as an adhesive (e.g., double sided tape, a thermo adhesive, etc.), a thread, a staple, an interference fit, a loop, a pin, etc. When attaching a bow to the tensioner 112, it may be desirable to situate portions of the tensioner 112 on the side 118 of the body 102 between the openings 116 rather than under the bottom wall 122 of the body 102.FIG. 2 is a diagram illustrating a partially cutaway top view of a portion of the system 100A of the present invention. The cover 130 is seen releasably attached to the body 102 so as to cover at least a portion of the flower 108 situated within the cavity 158 of the body 102.

FIG. 3 is a diagram illustrating a bottom view of a portion of the system 100A of the present invention. The tensioner 112 may extend about and couple to the bottom wall 122 of the body 102 using any suitable coupler such as an adhesive 111. Thus, the tensioner 112 may continuously extend between the openings 116.

In some embodiments it is envisioned that the tensioner may be discontinuous between the openings 116 within the cavity 158 and/or externally of the body 102. In yet other embodiments, it is envisioned that the tensioner may be formed from one or more discrete portions as opposed to a single portion of a suitable material (e.g., ribbon, etc.). For example, in some embodiments the tensioner may include first and second tensioners each extending between proximal and distal ends. The first and second tensioners may extend through corresponding openings 116 of the body 102 such that the proximal ends may be situated within the cavity 158 and may be coupled to the platform 158. The distal ends may be situated externally of the body 102 and may have a size and a shape such that they are suitable for grasping by a user to raise the platform 150 coupled thereto. In yet other embodiments, it is envisioned that the distal ends may be coupled to each other.

Figure 4A:
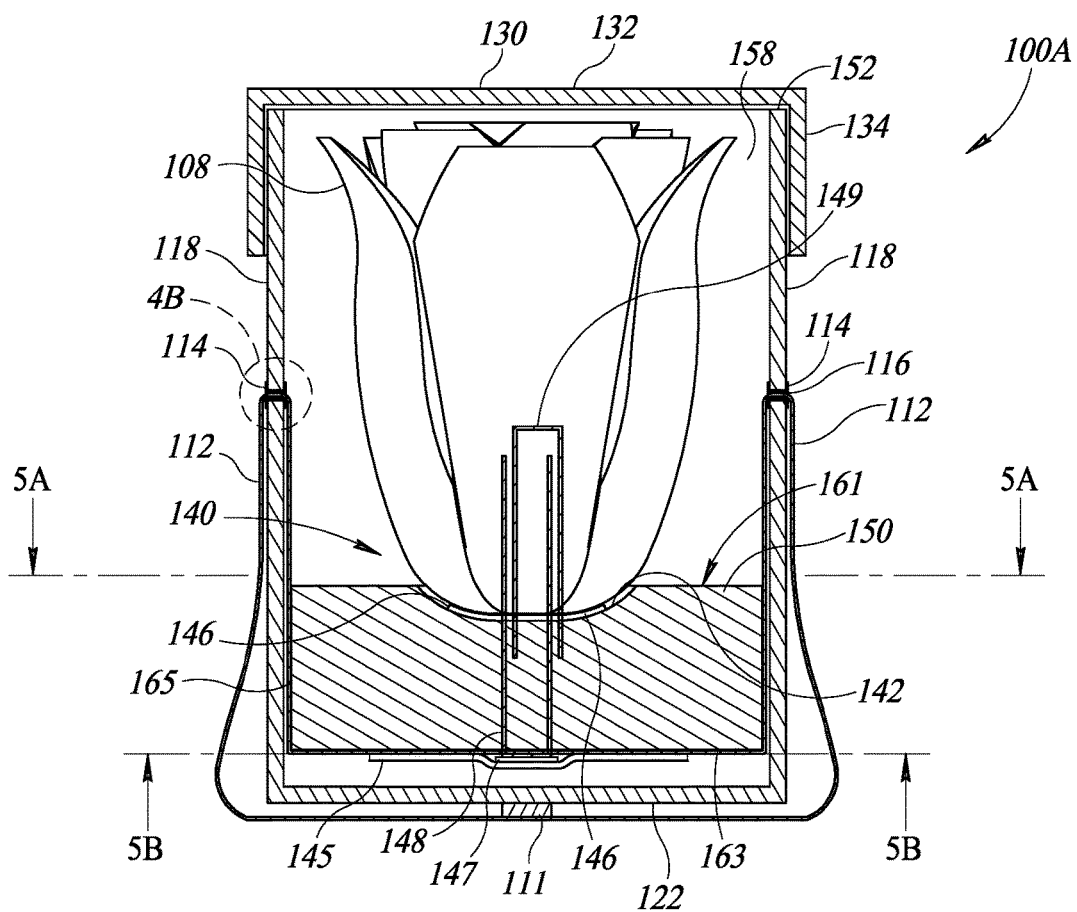
FIG. 4A is a diagram illustrating a cross-sectional view of a portion of the system of the present invention taken along lines 4A-4A of FIG. 3.

FIG. 4A is a diagram illustrating a cross-sectional view of a portion of the system 100A of the present invention taken along lines 4A-4A of FIG. 3. The cover 130 may be removably attached to the body 102 using any suitable coupling such as an interference fit. The platform 150 is shown in a lowered (e.g., stored or fully or substantially recessed) position in which the flower 108 is situated partially or fully within the cavity 158 of the body 102. The tensioner 112 may extend through the grommets 114 of the openings 116 and may be coupled to body 102 outside of the cavity 158 using any suitable method such as the adhesive 111.

The grommets 114 may be formed from any suitable material such as plastic, metal, and/or the like and may be coupled to the body 102 using any suitable method such as interference fits, adhesives, compression fits, etc.

The well 142 of the platform 150 may be shaped and sized to position and/or couple the flower 108 to the platform 150.

The tensioner 112 may be coupled to the platform 150 using any suitable method. For example, the staples 148, 149 or other suitable fastener(s) (e.g. a nail, a pin, etc.) may couple the tensioner 112 to the platform 150. The staples 148, 149 may extend through the flower 108 to fasten it to the platform 150. In some embodiments, a coupler such as a cap 145 which may be configured to couple the tensioner 112 to the platform 150 and/or may raise a height of the platform 150 coupled thereto when the platform is inserted within the cavity 158 of the body 102. The diameter of the cap 145 may be the same as or may be smaller than a diameter of the platform.

In some embodiments, it is envisioned that any suitable coupling method such as an adhesive 147, a fastener, a bond (e.g., a friction weld, etc.), etc. may fixedly secure the tensioner 112 to the platform 150.

Figure 4B:
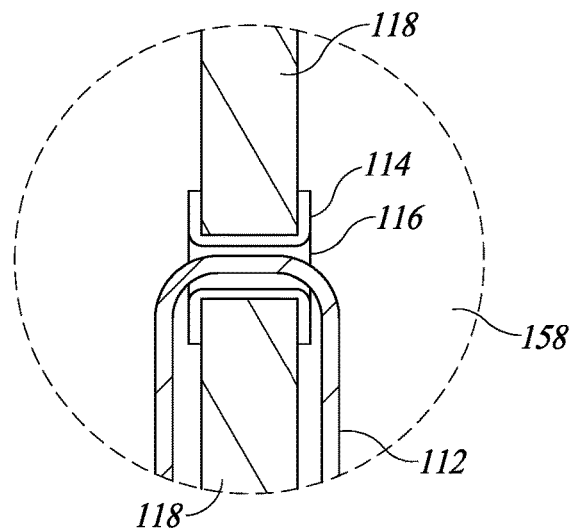
FIG. 4B is a diagram illustrating an enlarged view of a portion of region 4B of FIG. 4A in accordance with embodiments of the present system.

FIG. 4B is a diagram illustrating an enlarged view of a portion of region 4B of FIG. 4A in accordance with embodiments of the present system. One or more of the openings 116 may include the grommet 114 or the like (e.g., a cringle, an eyelet, etc.) through which the tensioner 112 may pass. The grommet 114 may be configured to provide a desired amount of friction when the tensioner 112 passes therethrough. The grommet 114 may be continuous or discontinuous about a periphery of the corresponding opening 116 and may be configured to reduce or otherwise prevent abrasion of the tensioner 112 during use. The grommet 114 may be formed from any suitable material such as metal, plastic, a polymer, etc. For example, it is envisioned that the grommet 114 may be formed from one or more metal rings or collars which may be press fit, or otherwise deformed (e.g., by applying pressure thereto), to couple to adjacent portions of the side wall 118. After the grommet 114 is inserted into a corresponding opening 116, pressure may be applied across opposed faces of the grommet 114 such that a portion of the grommet 114 may be deformed or otherwise crushed such that it may be fully or substantially flush with an adjacent portion of one or more of an outer or inner surface of the side wall 118 and may be firmly held in place relative to the side wall 118. For example, it is envisioned that the grommet 114 may be formed from one or more materials which may be coupled to each other. In yet other embodiments at least a portion of the grommet 114 may be thermoformed.

In accordance with some embodiments, it is envisioned that a coupler may hold the grommet 114 in place relative to the body 102. Suitable couplers may include adhesives, tapes, glues, interference fits, tabs, and/or the like.

It is further envisioned that the grommet 114 may be of a snap-fit type in which it may be inserted into a corresponding opening 116 and may lock into place automatically using, for example, one or more deformable tabs which may lock into place against an adjacent portion or portions of the side wall 118 when the grommet 114 is placed into the corresponding opening 116.

Figure 4C:
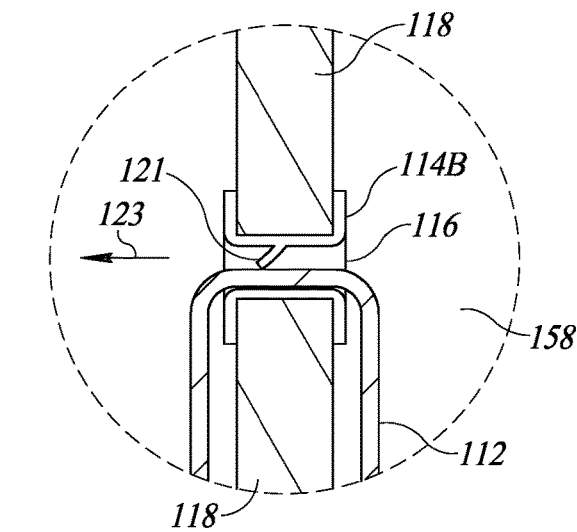
FIG. 4C shows a cross-sectional view of a portion of the grommet of FIG. 4B including at least one pawl.

It is envisioned that the grommets may include a holding mechanism which may provide for motion of the tensioner 112 in a single direction relative to the grommet 114. For example, FIG. 4C shows a cross-sectional view of a portion of the grommet 114 of FIG. 4B including at least one pawl 121. The pawl 121 may be configured to engage tensioner 112 so as to provide for motion of the tensioner 112 relative to the grommet 114 in a direction away from the cavity 158 as indicated by arrow 123 and may restrict, or entirely prevent travel of, the tensioner 112 in the opposite direction. This may lock the platform 150 in a raised position when desired such as after use by an end user. The pawl 121 may include a release tab which may be depressed to release the pawl 121 from the tensioner 112. This may provide for movement of the tensioner 112 in an opposite direction. It is further envisioned that the tensioner 112 may include teeth which may engage the pawl 121. It is further envisioned that pawls may be located on both sides of the tensioner 112. The orientation of the pawl with regard to the grommet 114 on the other side of the body 102 may be reversed with regard to the body 102 so as to provide for motion of the tensioner 112 relative to the corresponding grommet 114 in a direction away from the cavity 158 and may restrict or entirely prevent travel of the tensioner 112 in the opposite direction.

Figure 5A:
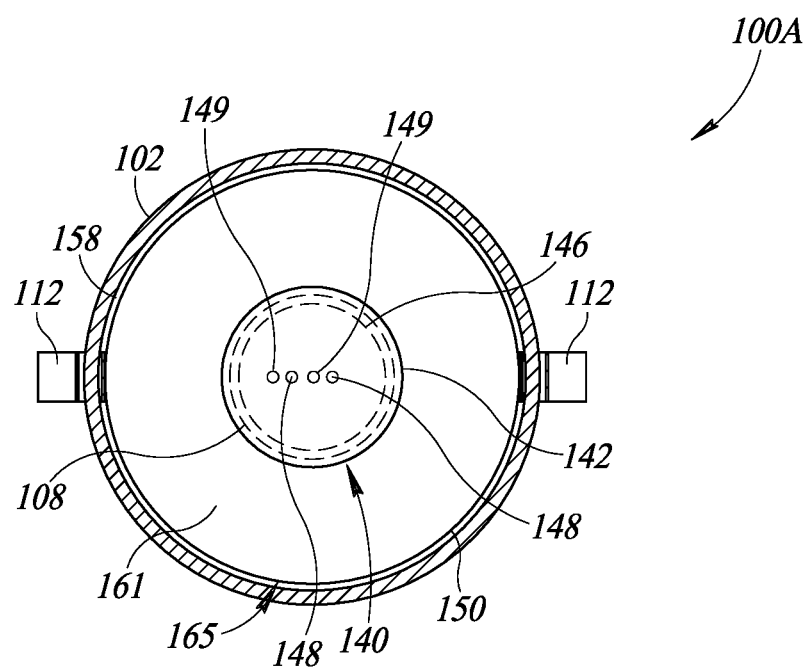
FIG. 5A is a diagram illustrating a cross-sectional view of a portion of the system of the present invention taken along lines 5A-5A of FIG. 4A.

FIG. 5A is a diagram illustrating a cross-sectional view of a portion of the system 100A of the present invention taken along lines 5A-5A of FIG. 4. The coupler 140 may include one or more of the adhesive 146 situated in the well 142 of the platform 150 and/or one or more of the staples 148, 149 which may extend through the platform 150. The platform 150 may be shaped and sized such that its side wall 165 may be configured to stabilize the platform 150 within the cavity 158 of the body 102. In yet other embodiments it is envisioned that the coupler 140 may include one or more pins.

Figure 5B:
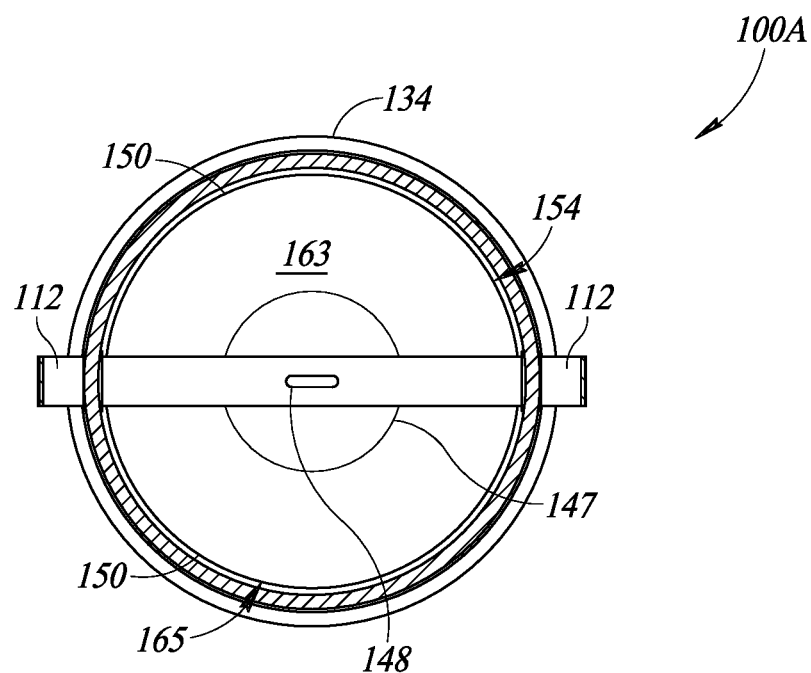
FIG. 5B is a diagram illustrating a cross-sectional view of a portion of the system of the present invention taken along lines 5B-5B of FIG. 4A.

FIG. 5B is a diagram illustrating a cross-sectional view of a portion of the system 100A of the present invention taken along lines 5B-5B of FIG. 4A. The staple 148 and/or the adehsive147 may couple the tensioner 112 to the platform 150. It is envisioned that the staple 148 may extend through the tensioner 112 so as to couple the tensioner 112 to the platform 150. In yet other embodiments, it is envisioned that the tensioner 112 may be tied to the platform 150 or may be slidably coupled to the platform 150. In some embodiments the tensioner 112 may pass through a loop of the staple 148 such that it may be slidably coupled to the platform 150 by the staple 148. For example, it is envisioned that the platform 150 may include one or more of a notch, an opening, or a channel through which the tensioner 112 or portions thereof may pass so as to be fixedly or slidably coupled to the platform 150.

Figure 6A:
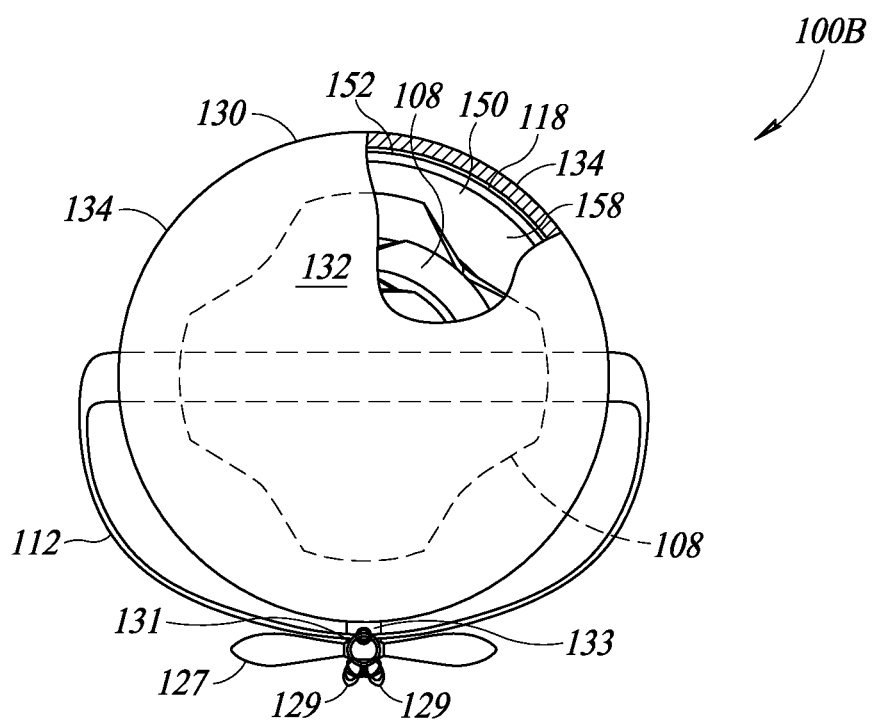
FIG. 6A is a diagram illustrating a partially cutaway top view of a portion of the system of the present invention.

FIG. 6A is a diagram illustrating a partially cutaway top view of a portion of the system 100B of the present invention. The cover 130 is seen releasably attached to the body 102 so as to cover at least a portion of the flower 108 situated within the cavity 158 of the body 102. The tensioner 112 may extend about the side wall 118 of the body 102 and may optionally include the bow 127 and one or more charms 129 attached thereto. The bow 127 may be coupled to the tensioner 112 using any suitable fastener. For example, the bow 127 may be coupled to the tensioner 112 using an adhesive 131 (e.g., double sided tape, a thermo adhesive, etc.), a thread, a staple, an interference fit, a loop, a pin, etc.

The one or more charms 129 may be coupled to the bow 127 using any suitable fastener. For example, the one or more charms 129 may be coupled to the tensioner 112 using an adhesive (e.g., double sided tape, a thermo adhesive, etc.), a thread, a staple, an interference fit, a loop, a pin, etc. It is envisioned the tensioner 112 may be coupled to side wall 118 of the body 102 using a coupler 133 such as an adhesive or the like. In some embodiments it is envisioned that the coupler 133 may include any other suitable coupler such as a magnetic coupler, an interference fit coupler, etc. The coupler 133 may be releasable and/or repositionable. For example, after the platform 150 is positioned in a raised position, the coupler 133 may position the tensioner 112 and/or the bow 127 in a desired position along the side wall 118. Such positioning, for example, may place couple at least a portion of the tensioner 112 such that a portion of the bow 127 may be situated at a level which may be even with the bottom wall 122 (or portions thereof) of the body 102 or between the top wall 152 (or top edge) and the bottom wall (e.g., 153) of the side wall 118 when the platform 150 is fully or substantially raised relative to the body 102.

Figure 6B:
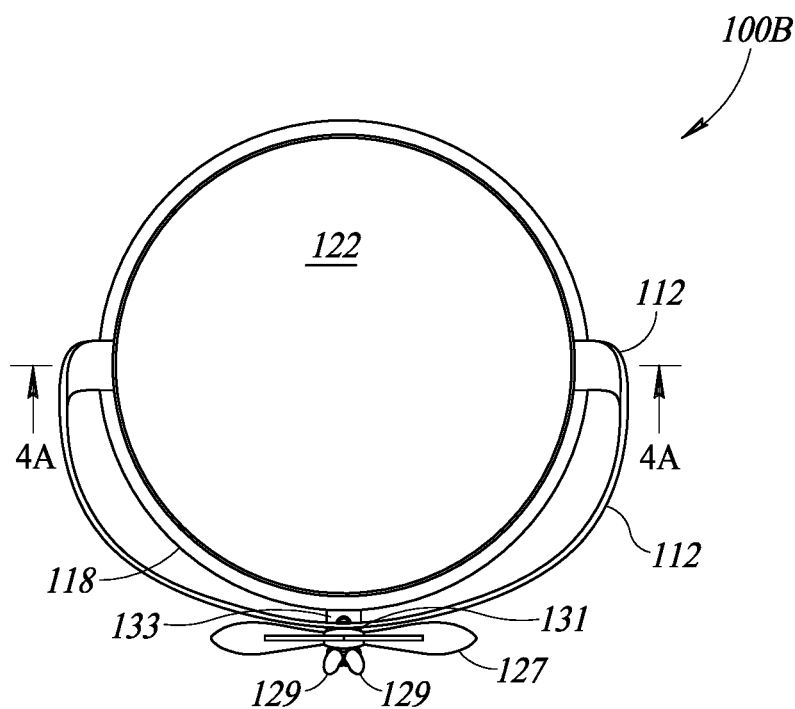
FIG. 6B is a diagram illustrating a bottom view of a portion of the system of the present invention.

FIG. 6B is a diagram illustrating a bottom view of a portion of the system 100B of the present invention. The tensioner 112 may extend about and may be coupled to the side wall 118 of the body 102.

Figure 7:
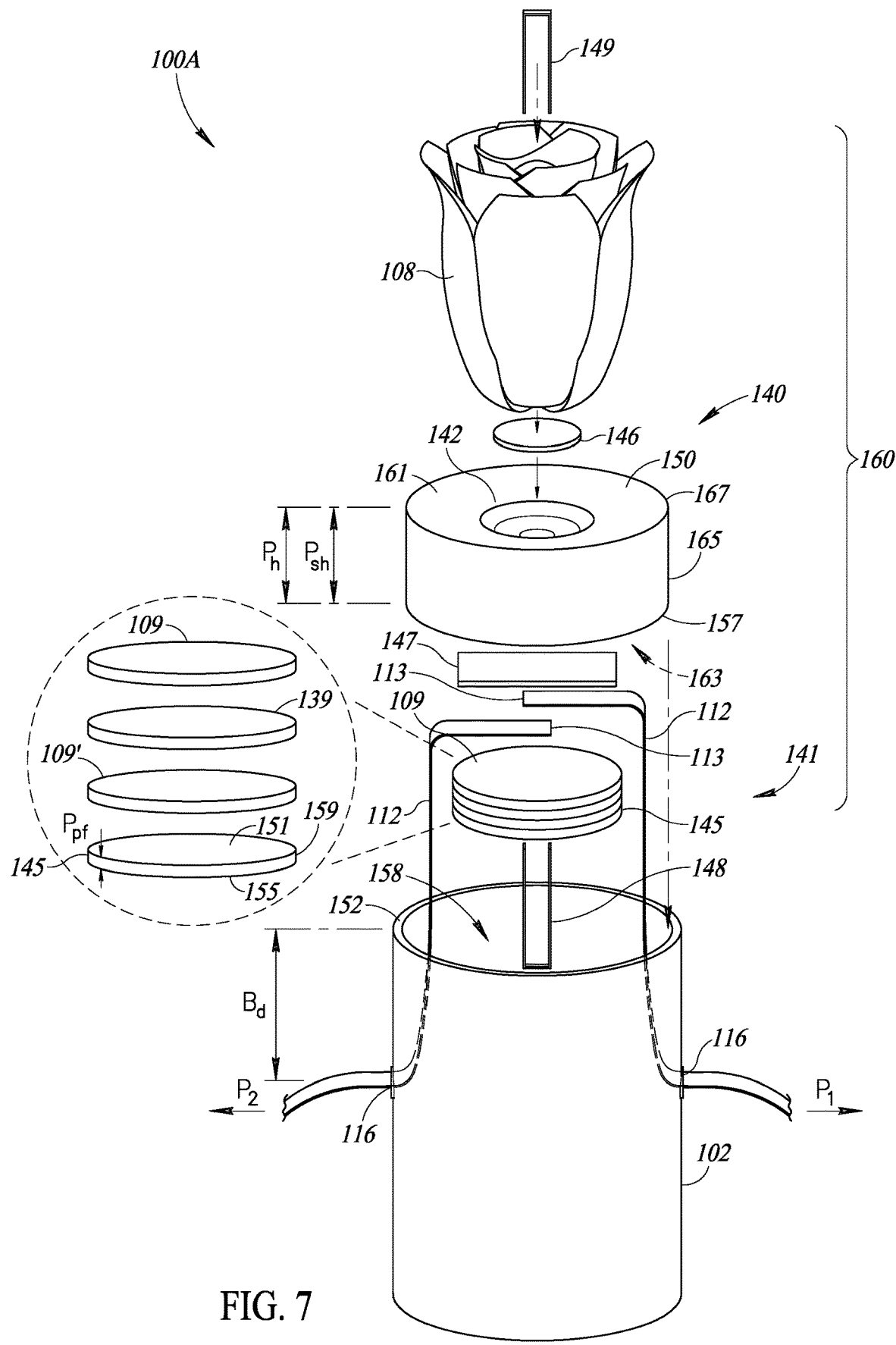
FIG. 7 is a diagram illustrating a partially exploded perspective front view of a portion of the system of the present invention.

FIG. 7 is a diagram illustrating a partially exploded perspective front view of a portion of the system 100A of the present invention. Portions of the tensioner 112 may extend through corresponding openings 116 of the openings 116. A coupler 141 may couple the tensioner 112 to the platform 150 and may include any suitable coupling method. The coupler 140 may couple the flower 108 to the platform 150 using any suitable coupling method. An assembly including the platform 150, the attached flower 108, and/or the tensioner 112 may be formed and thereafter portions thereof may be situated within or inserted into the cavity 158 of the body 102.

The coupler 140 may include one or more of the adhesive 146 and/or the staples 148, 149 which may couple the flower 108 to the platform 150. In some embodiments, the coupler 140 may include an opening in the platform 150 which may receive the flower or portions thereof such as an optional stem. For example, in some embodiments the optional stem of the flower 108 may be inserted into the platform 150.

It is envisioned that the coupler 141 may include any suitable method of coupling the tensioner to the platform 150 such as one or more of the staple 148, a bond, a weld, the adhesive 147 or the like, and/or the cap 145. For example, the tensioner 112 may be situated between the platform 150 and the cap 145 and may be secured to the platform 150 by the adhesive 147. It is further envisioned that the adhesive 147 may secure the cap 145 to the platform 150. In some embodiments it is envisioned that one or more of the tensioner 112 and/or the cap 145 may be secured to the platform 150 using any suitable bonding method such as an interference fit, a friction weld and/or the like. It is also envisioned that that the staple 148 may pass through and/or secure one or more of the cap 145, the tensioner 112, the adhesive 147, the platform 150, the adhesive 146, and the flower 108 to each other.

The cap 145 may have a diameter that may be similar to, or smaller than, the diameter of the platform 150. It is envisioned that the cap 145 may include a top wall 151, a bottom wall 155, and a side wall 159 situated between the top wall 151 and the bottom wall 163. The cap 145 may have a height ($P_{pf}$) which may be configured to set a height of the platform 150 and the flower 108 attached thereto to a desired height. For example, this height may be set such that a top of the flower 108 may be at or below the top wall 152 (or top edge) of the body 102. It would be appreciated that other heights are also envisioned. For example, it is envisioned that the height $P_{pf}$ may be sufficiently small such that the cap 145 may be a thin film or the like. It is envisioned that the side wall may optionally contact the side wall 118 of the body 102. The cap 145 may include one or more edges situated between the side wall and one or more of the top and bottom walls 151 and 155, respectively, that may include a chamfer or round or the like to enhance ease of insertion of the platform 150 into the cavity 158. The cap 145 may be formed from any suitable material such as a foam or the like. In some embodiments, it is envisioned that the cap 145 may be formed from other suitable materials such as cardboard, foam, polymers (e.g., plastic), wood, metal, etc.

The cap 145 may be shaped and/or sized similarly to the platform 150 with the same or a different thickness such that it may fit within the cavity 158 of the body 102. It would be appreciated that other shapes and/or sizes are also envisioned for the cap 145. For example, it is envisioned that the cap 145 may be formed from a strip (e.g., a foam strip, a plastic strip, etc.) or may be shaped and/or sized like a figure "X," etc.

In some embodiments, an optional rigidity enhancing member 139 may be provided to increase rigidity of the platform 150 or portions thereof as may be desired. The rigidity enhancing member 139 may sandwiched between, and coupled to, the platform 150 and the cap 145 using any suitable method or methods such as adhesive layers 109 and 109', etc. In yet other embodiments, it is envisioned that the rigidity enhancing member 139 may be formed integrally with the cap 145. In some embodiments it is envisioned that the rigidity enhancing member 139 may be situated at other locations such as within the platform 150, between the tensioner 112 and the platform 150, etc. In yet other embodiments, the cap 145 may be coupled to the platform 150 using a single adhesive layer (e.g., layer 109).

It would be further appreciated that the coupler 141 may secure optional ends 113 of the tensioner 112 to each other and/or to the platform 150. For example, the adhesive 147 and/or an adhesive 109 may secure the optional ends 113 of the tensioner to each other. Although a lap-type joint is shown joining ends 113 of the tensioner 112 other types of joints may be employed such as a but-type joint, etc. It is further envisioned that the ends 113 of the tensioner 112 may be coupled to platform 150 such that they may be separated from each other. For example, in some embodiments the ends 113 of the tensioner may be situated and/or coupled to a bottom wall 163 or a side wall 165 of the platform 150.

In some embodiments, it is envisioned that ends of the tensioner 112 may be situated outside of the cavity 158 and secured to each other using any suitable method such as a friction bond, a thermal bond, an adhesive, a stitch, a rivet, a screw, a clasp, a ring, etc. It is further envisioned that the tensioner 112 may be formed in a loop without ends. Although the optional ends 113 of the tensioner 112 are shown overlapping to form a lap-type join, other types of joins are also envisioned. In some embodiments, it is envisioned that ends of the tensioner may be situated apart from each other and coupled to the platform 150 such that the assembly including the platform 150 and the tensioner 112 attached thereto forms at least a portion of the loop. For example, ends of the tensioner 112 may be coupled to the side wall of the platform 150.

The platform 150 may include a top wall 161, the bottom wall 163 and the side wall 165 situated between the top wall 161 and the bottom wall 163. The side wall 165 may have a height $P_h$ and may be configured to contact the side wall 118 of the body 102. The platform 150 may include edges 157, 167 between one or more of the side wall 165, and the top or bottom walls 161 and 163, respectively. The edges 157, 167 may include a chamfer or round which may enhance ease of insertion of the platform 150 into the cavity 158. It would be further appreciated that one or more of the side wall 165 and/or the chamfered edges 157, 167, may be configured to reduce or prevent friction such as static friction (e.g., stiction) between the platform 150 and the side wall 118 of the body 102 when moving the platform 150 relative to the body 102. For the sake of clarity, it will be assumed that the height of the side wall 165 that may contact the side wall 118 of the body 102 between the edges 157 and 167 may be defined as the platform skirt height ($P_{sh}$). Increasing a length of $P_{sh}$ may increase stability of the platform 150 within the cavity 158 of the body 102. For the sake of clarity, it will be assumed that $P_{sh}$ may be equal to, $P_h$. In yet other embodiments, it should be understood that $P_h$ may be smaller than $P_{sh}$ when the edges 157 and/or 167 include a round or a chamfer as may be desired.

The openings 116 may be positioned substantially opposite each other at a distance $B_d$ from the top wall 104 of the body 102 such that $B_d$ may be greater than, or equal to, $P_h$. For example, $B_d$ may be substantially equal to $P_h$ such that the top wall 161 of the platform 150 may be raised to about the top wall 104 of the body 102 when the tensioner 112 is tensioned by pulling portions of the tensioner 112 which extend from corresponding openings 116 in opposite directions as illustrated by arrows P1 and P2. This may shorten that length of the tensioner 112 that is in the cavity 158 so as to raise the platform 150. In some embodiments, it is envisioned that $B_d$ may be less than $P_h$ which may raise the height of the platform 150 relative to the body 102 when fully raised as opposed to embodiments in which $B_d$ may be substantially equal to $P_h$. It would be appreciated that other relationships and/or values of $B_d$ and $P_h$ are also envisioned.

Figure 8A:
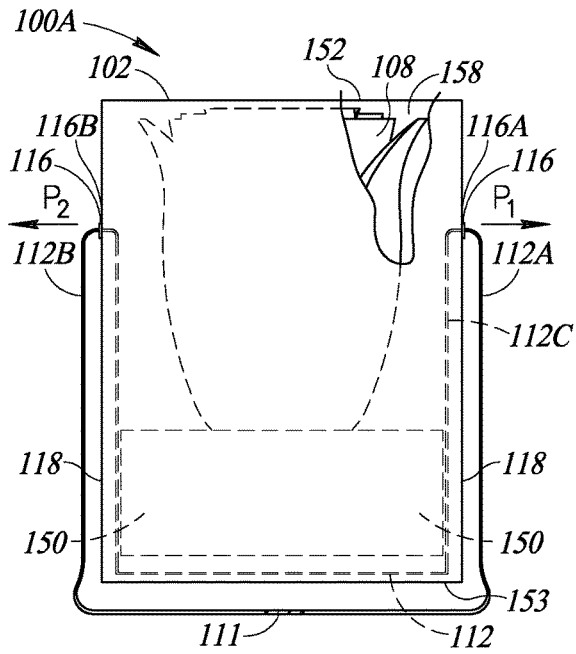
FIG. 8A is a diagram illustrating a partially cutaway front view of the body of the system of the present invention with the cover removed and the platform in a fully recessed position.
Figure 9:
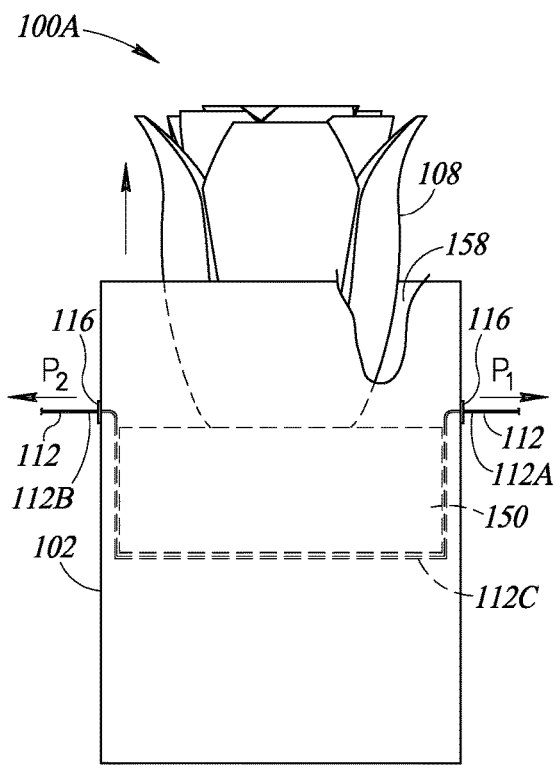
FIG. 9 is a diagram illustrating a partially cutaway front view of the body of the present system of the present invention with the cover removed and the platform in a partially raised position.
Figure 10:
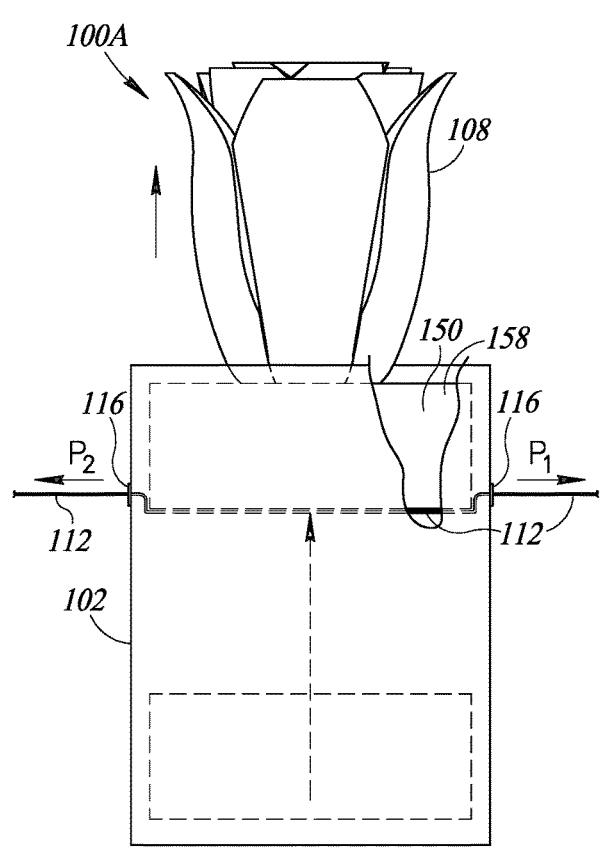
FIG. 10 is a diagram illustrating a partially cutaway front view of the body of the present system of the present invention with the cover removed and the platform in a substantially raised position.

A process of raising the platform of the system 100A will now be described with reference to FIGS. 8A and 9 through 10 below wherein FIG. 8A is a diagram illustrating a partially cutaway front view of the body 102 of the system 100A of the present invention with the cover 130 removed and the platform 150 in a fully recessed position; FIG. 9 is a diagram illustrating a partially cutaway front view of the body 102 of the system 100A of the present invention with the cover 130 removed and the platform 150 in a partially raised position; and FIG. 10 is a diagram illustrating a partially cutaway front view of the body 102 of the system 100A of the present invention with the cover 130 removed and the platform 150 in a substantially or fully raised position. The operation of the system 100B may be similar to the operation of system 100A. Accordingly, the operation of system 100A may be understood to apply to the operation of system 100B. With reference to FIG. 8A, a user may grasp portions of the tensioner 112 which extend outward from the openings 116 on either side of the body 102. The user may then pull the grasped portions of the tensioner 112 in opposite directions as illustrated by arrows P1 and P2 of FIG. 9. This may shorten a portion of the tensioner that is within the cavity 158 and at the same time be operative to cause the tensioner 112 to apply a force which may raise the platform 150 and the flower 108 attached thereto as illustrated in FIG. 9. With reference to FIG. 10, continued pulling of the tensioner 112 in opposite directions as illustrated by arrows P1 and P2 may cause the tensioner 112 to continue to apply a force which may raise or otherwise elevate the platform 150 and the flower 108 attached thereto to a fully raised position as illustrated. The shape and/or size of the platform 150 and the body 102 may be configured such that an interference fit suitable to maintain the fully raised position of the platform 150 may be maintained. In some embodiments it is envisioned that an interference fit of the tensioner 112 and the corresponding openings 116 may establish sufficient friction to maintain the fully raised position of the platform 150 relative to the body 102. In some embodiments, it is envisioned that a locking member such as an interference fit, a mechanism such as a tab, and/or a notch may be provided to lock the platform 150 in position relative to the body 102.

Figure 8B:
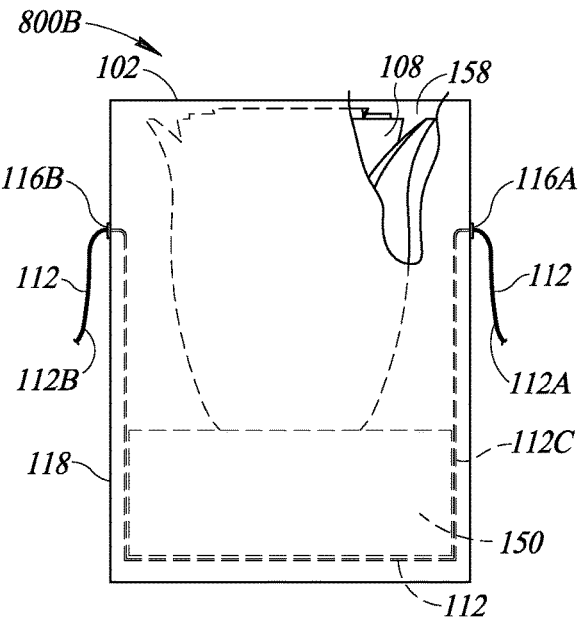
FIG. 8B is a diagram illustrating a partially cutaway front view of the body of the system of the present invention with the cover removed and the platform in a fully recessed position.

Depending upon embodiments, the tensioner may be fixedly or slidably secured to the platform. In accordance with some embodiments of the present system, the tensioner may be slidably secured to the platform. This configuration may enable the platform to be raised or substantially raised relative to the body by pulling on one or both sides of the tensioner. Embodiments in which it will be assumed that only a single side of the tensioner will be pulled and the other side of the tensioner may remain in position relative to the body will now be discussed with reference to FIG. 8B which is a diagram illustrating a partially cutaway front view of the body 102 of a system 800B of the present invention with the cover 130 removed and the platform 150 in a fully or substantially recessed position. The system 800B may be similar to the system 100A shown in FIG. 8A with a tensioner 112 that may be slidably secured to the platform 150 rather than fixedly secured. A coupler such as the adhesive 111 may couple a portion of the tensioner 112 to the body 102. Portions of the tensioner 112 that are on the outside of the body 102 and on either side of the adhesive 111 (or coupler) may be denoted as tensioners 112A and 112B as shown. That portion of the tensioner 112 that is within the cavity 158 may be referred to as portion 112C. Sizes of portions of the tensioner (e.g., 112A, 112B, and 112C) may change as portions of the tensioner 112 are pulled through a corresponding opening such as an opening 116A in the present embodiment, For example, when a portion 112A of the tensioner 112 is pulled (e.g., by a user) in the direction of arrow P1, this pulling may cause portions of the tensioner 112 that are situated within the cavity 158 to pass through the opening 116A thus shortening portion 112C that is situated within the cavity 158. Continued pulling and resultant travel of the tensioner 112A in the direction of arrow P1 may further shorten section 112C (or sections 112C) within the cavity 158 and may raise the platform 150 to the fully or substantially raised position such that the flower 108 attached thereto may be situated in a display position. Thus, the platform 150 may be elevated and/or suspended by that portion of the tensioner 112 that is situated within the cavity 158 (e.g., 112C) and may be supported by the side wall 118 of the body 102 between the openings 116 (e.g., 116A and 116B). During this operation, the coupler 111 may maintain (or substantially maintain) a position of that portion 112B of the tensioner 112 such that there is little or no movement of the tensioner 112 through the opening 116B. An interference fit between the platform 150 and adjacent portions of the body 102 may secure the platform 150 in position relative to the body 102 once raised.

Figure 8C:
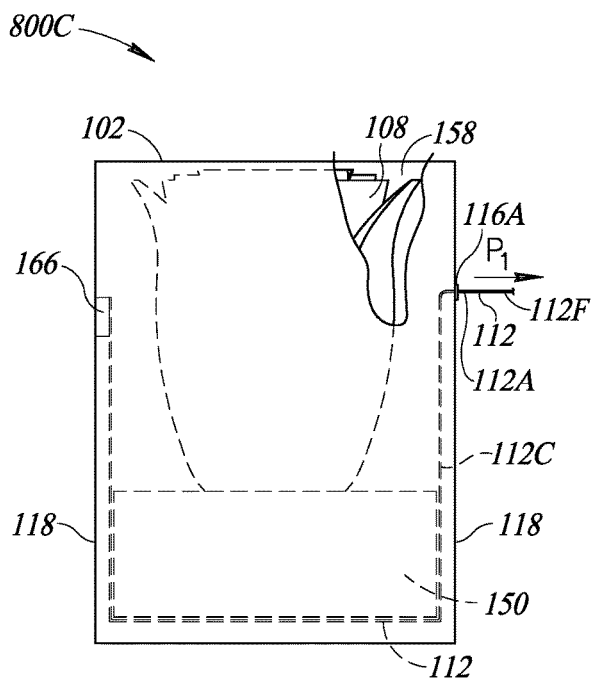
FIG. 8C is a diagram illustrating a partially cutaway front view of the body of a system of the present invention with the cover removed and the platform in a fully recessed position.

As there is little or no movement of the tensioner 112 through the opening 116B, a portion of the tensioner 112 may be secured to the wall 118 of the body 102 and the tensioner 112 may only need to pass through a single opening. This is illustrated with reference to FIG. 8C which is a diagram illustrating a partially cutaway front view of the body 102 of a system 100C of the present invention with the cover 130 removed and the platform 150 in a fully recessed position. The system 800C may be similar to the system 800B shown in FIG. 8B with a tensioner 112 that may be slidably secured to the platform 150. The tensioner 112 may be secured to the wall 118 at a location that is opposite opening 116A through which the tensioner 112 may pass. The tensioner 112 may be secured to the wall 118 of the body 102 at a location that is inside (as shown) or outside of the cavity 158 using any suitable coupler, such as an adhesive 166, a bond, a weld, a screw, a stud, a rivet, a stitch, etc. Operation of raising the platform 150 by pulling on the tensioner 112 (at its free end 112F) in the direction of arrow P1 may be similar to that described above with reference to FIG. 8B. For example, a user may grasp a free end 112F of the tensioner 112 and pull it in the direction of arrow P1 to raise the platform 150.

Figure 11:
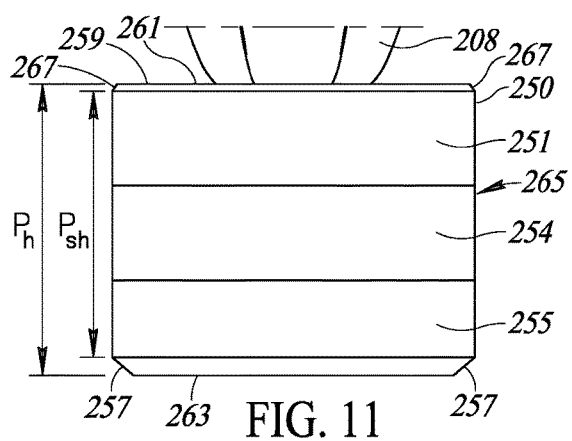
FIG. 11 is a diagram illustrating a front view of a portion of an example platform of the present invention.

FIG. 11 is a diagram illustrating a front view of a portion of an example platform 250 of the present invention. The platform 250 may be coupled to at least one flower 208 and may be similar to the platform 150. The platform 250 may include a top wall 261, a bottom wall 263, and a side wall 265 and may be formed from a plurality of layers superimposed upon and coupled or laminated to each other such as layers 251, 254, 255, and 259. The layers 251, 254, 255, and 259 may be formed from the same or different materials. These materials may have the same or different characteristics (e.g., rigidity, density, weight, firmness, etc.) and may be coupled to each other using any suitable method or methods such as adhesive bonding, chemical bonding, electrostatic bonding, heat bonding, friction welding, friction fitting, nailing, screwing, pegs, magnetic bonding, etc. Adding layers may enhance characteristics of the platform 250 and/or may increase a height $P_h$ (e.g., a total height) and/or a skirt height $P_{sh}$ of the platform 250 as shown. Edge 267 may be situated between the top wall 261 and the side wall 265, and edge 257 may be situated between the bottom wall 263 and the side wall 265.

One or more of the edges 257 and 267 may be chamfered, rounded, filleted, or square as may be desired and may be the same as or different (e.g., in size, angle, round, etc.) from each other. For example, edge 257 may be square and edge 267 may be chamfered as shown. In accordance with some embodiments, one or more of layers may include a foam and/or rigidity enhancing layer.

In some embodiments, one or more of the layers (e.g., 251, 254, 255, and/or 259), may include foam, cardboard, plastic, foil, fabric, leather, ceramic, glass, etc. A thickness (e.g., as measured in relation to the height of the platform 250) of one or more of the layers 251, 254, 255, and 259 may be varied to increase and/or decrease the height $P_h$ of the platform 250. This may be desirable to match the height of the platform to a height of a corresponding flower 208 and/or body such that when the platform 250 is fully recessed in the body the top of the flower may be at a desired height relative to the top of the body as may be desired. This may enhance aesthetics of the package. One or more of the edges 257 and 267 may be chamfered to aid in alignment and/or insertion of the platform 250 within the body.

With regard layer 259, this layer may be a finishing layer which may provide desired aesthetics and may be formed from any suitable material such as leather, fabric (e.g., velvet which may be electrostatically deposited, etc.), plastic, metal (e.g., aluminum, stainless steel, etc.), ceramic, cardboard, paper, glass (e.g., mirrored glass, etc.), and/or the like and may form at least part of the top wall 261 of the platform 250. With regard to one or more of the layers 254, 255, and 259 these layers may be selected as desired. For example, layers closer to the bottom wall 263 may be firmer than those closer to the top wall 261. This may maintain a shape of the platform 250 as tension is applied to the tensioner when the platform 250 is raised in the body. A low-friction surface may be applied to one or more of the layers 251, 254, 255, and 259. For example, the edge 257 may include a low friction layer to reduce friction between the platform 250 and a tensioner in contact with the platform 250. This may reduce a force necessary to be applied to the tensioner when raising the platform 250 situated within a body for display of the flower 208.

It should be appreciated that stability of the platform 250 within a body may be increased by increasing the length of the platform skirt height $P_{sh}$ which may prevent the rocking of the platform 250 when it is inserted within the cavity of the body according to embodiments of the present system. The platform 250 may be shaped and sized such that it may correspond with a shape and size of a receiving body in accordance with embodiments of the present system and may have a snug fit such that an interference fit may be maintained between the platform 250 and the body in which it is located.

In accordance with embodiments of the present system, it is envisioned that a platform may be formed from a cardboard material such as corrugated cardboard which may be rolled in a spiral to form the desired shape and may be coupled to a flower. In yet other embodiments, the platform may be formed using a plurality of layers of cardboard that may be laminated upon each other.

Figure 12:
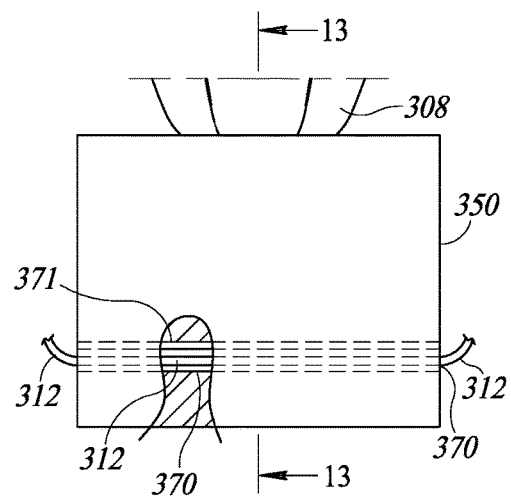
FIG. 12 is a diagram illustrating a partially cutaway front view of a portion of an example platform of the present invention.

FIG. 12 is a diagram illustrating a partially cutaway front view of a portion of an example platform 350 of the present invention. The platform 350 may include an opening or cutout such as a channel 370 which may be configured to receive a tensioner 312. Accordingly, the tensioner 312 may pass, entirely or partially, through the channel 370. The tensioner 312 may be fixedly or slidably located relative to the channel 370. For example, tensioner 350 may be secured within the channel 370 using any suitable coupling method such as an interference fit, an adhesive, a staple, and/or the like so as to be fixedly secured within the channel 370.

In some embodiments, the tensioner 312 may be slidably located within the channel 370. The channel 370 may include a low-friction surface to enhance movement of the tensioner 312 relative to the channel 370. It is envisioned that the low friction surface may be deposited upon one or more surfaces of the channel 370 in contact with the tensioner 312 or may be provided by a solid (e.g., a strip or strips) or a tubular member (e.g., a Teflon™ tube) situated within the channel 370. The tensioner 312 may pass through the tubular member. The tubular member may have a cross sectional shape which may correspond with a cross section of the channel 370. It is envisioned that this cross sectional shape may be any suitable shape such as square, round, oval, rectangular, etc. as may be desired.

Figure 13:
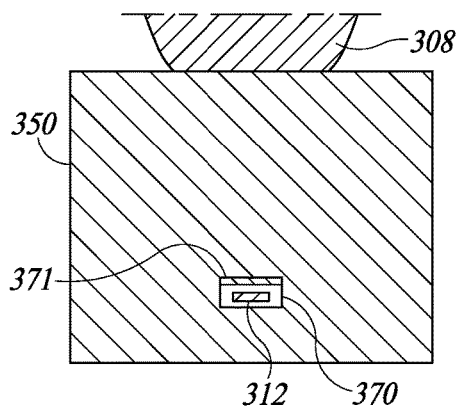
FIG. 13 is a diagram illustrating a cross-sectional view of a portion of the example platform the present invention taken along lines 13-13 of FIG. 12.

FIG. 13 is a diagram illustrating a cross-sectional view of a portion of example platform 350 the present invention taken along lines 13-13 of FIG. 12. The channel 370 may include a rigid layer 371 which may be configured to enhance rigidity of one or more walls of the channel 370 such as an upper wall 370. The rigid layer 371 may include a friction-reducing layer (e.g. a low friction surface). The tensioner 312 may be coupled to platform 350 using any suitable method (e.g., bonding, adhesives, fasteners (e.g., staples, pins, etc.), etc.) or may be slidably coupled to the platform 350. Ends of the channel 370 may be beveled (e.g., include a chamfered or rounded end) to enhance insertion, placement and/or travel of the tensioner 312 within the channel 370. In some embodiments, the tensioner may be coupled to the platform directly or indirectly.

In accordance with some embodiments the present system, it is envisioned that a platform may include one or more channels for receiving corresponding portions of one or more tensioners. It is also envisioned that the tensioner may pass one or more times through one of these channels. In accordance with embodiments of the present system, a platform may include a notched area which may form at least part of a channel for receiving a tensioner. This notched area may be situated on side and/or bottom walls of the platform. It is further envisioned that a platform may be formed integrally with a flower (e.g., a plastic platform and flower).

Figure 14:
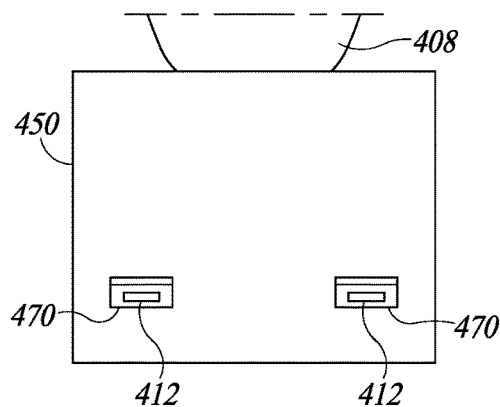
FIG. 14 is a diagram illustrating a side view of a portion of an example platform of the present invention.

FIG. 14 is a diagram illustrating a side view of a portion of an example platform 450 of the present invention. The platform 450 may include a plurality of openings or cutouts such as a channels 470 each of which may be configured to receive a corresponding portion of a tensioner 412. Accordingly, the corresponding portions of one or more tensioner 412 may pass, entirely or partially, through the corresponding channels 470. The channel 470 may include one or more rigid layers 471 which may include low friction surfaces if desired. The platform 450 may be configured to be coupled to a flower 408 in accordance with embodiments of the present system. In yet other embodiments, a channeled member having an opening through which a tensioner may pass fully or partially through may be situated within the corresponding channel 470. For example, this channeled member may include a tube or the like and may include any suitable cross section configured to receive the tensioner.

It is envisioned that the ends of the tensioner may be secured at opposed sides of the platform. For example, free ends of the tensioner may pass through openings in the side of the body and may be fixedly secured to the sides or bottom of the platform.

Figure 15:
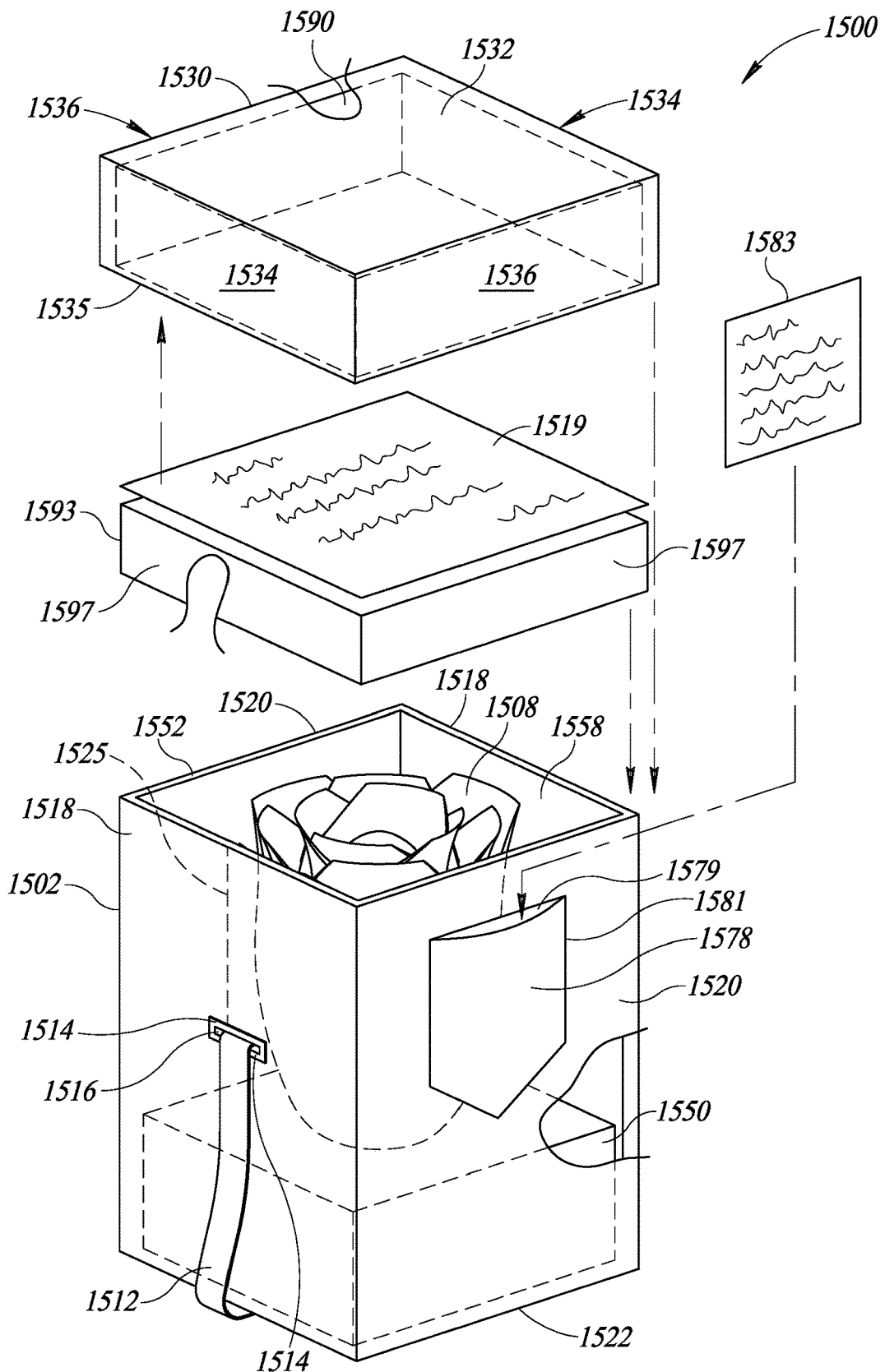
FIG. 15 is a diagram illustrating a partially cutaway and exploded perspective front view of a portion of an example flower container system of the present invention according to a third embodiment.

Embodiments of the present system may further employ bodies and/or corresponding covers having different shapes such as square, oval, rectangular, polygonal, etc. when viewed from the top. For example, FIG. 15 is a diagram illustrating a partially cutaway and exploded perspective front view of a portion of an example flower container system (hereinafter system 1500 for the sake of clarity) of the present invention according to a third embodiment. The system 1500 may include one or more of a body 1502, a flower 1508, a platform 1550, a tensioner 1512, and a cover 1530.

The body 1502 may include one or more walls such as side walls 1518, end walls 1520, and a bottom wall 1522 which may define at least a portion of a cavity 1558 which may be configured to receive the flower 1508 coupled to the platform 1550. One or more of the side walls 1518 and end walls 1520 may define at least a portion of a top wall 1552. The body 1502 may form a substantially square shape when viewed from the top (e.g., into the cavity 1558).

One or more of the side walls 1518 may include one or more openings such as openings 1516 which may be configured to receive, and or to provide passage of, corresponding portions of the tensioner 1512 which may pass therethrough. One or more of the openings 1516 may include a grommet 1514 or the like (e.g., a cringle, an eyelet, etc.) through which the tensioner 1512 may pass.

If desired, an optional insertion notch 1525 may be provided and may extend from one or more of the openings 1516 to the top wall 1552 (as shown) or the bottom wall 1522 so that the tensioner 1512 may be easily and conveniently be inserted into a corresponding opening 1516 via the insertion notch 1525. The insertion notch 1525 may be provided when, for example, the tensioner 1512 (and/or the platform 1550 coupled thereto) may form a loop prior to insertion of the tensioner 1512 into the openings 1516. After insertion of the tensioner 1512, the insertion notch 1525 may be sealed using any suitable method such as adhesives, tapes, staples, grommets, a biasing force, etc. It is envisioned that the optional insertion notch 1525 may be straight or may include other shapes which may prevent accidental removal of the tensioner 1550 once the tensioner is inserted into the openings 1516. An insertion notch may be provided for each respective opening 1516 of the openings 1516.

The cover 1530 may include one or more of a body having side walls 1534, end walls 1536, and a top wall 1532 which define at least a portion of a cavity 1590. One or more of the side walls 1534 and the end walls 1536 may have an edge 1535 defining an opening leading to the cavity 1590. The cover 1530 may be removed prior to raising the flower 1508 from the cavity 1558. An insert 1519 may be inserted within the cavity 1590 of the cover 1530 and may be secured using any suitable coupling such as am interference fit, an adhesive, a magnetic coupling, a pocket, etc. The insert 1519 may include, for example, a card, a note, a letter, etc. It is also envisioned that a card, note, letter, etc., may be coupled to the tensioner 1512 or body 1502 as may be desired. The insert 1519 may be shaped and/or sized similarly to a shape and/or size of the cavity 1590 so as to form a friction fit as may be desired. In some embodiments the insert 1519 may be shaped and/or sized differently from the shape and size of size of the cavity 1590. The insert 1519 may include text and/or graphics which may be printed or otherwise rendered by the system in accordance with insert information. This insert may include information entered or otherwise generated in accordance with input of a user. For example, a user may select a type of card and/or information to be printed on or in the card using a graphical user interface (GUI) rendered by a controller of the system and which may interact with the user.

An optional inner cover 1593 may be situated between the cover 1530 and the body 1502. The inner cover 1593 may be formed from a film or the like (e.g., a plastic sheet which may be folded to form one or more sidewalls 1597 which may position it relative to the body 1502. The optional inner cover 1593 may be configured to prevent color bleeding (e.g., bleed-through) from the flower 1508 to the cover 1530 or parts thereof.

One or more portions of the system may include a covering which may be formed from a desired material such as a patterned, fabric, cloth, paper, film, etc. which may be coupled to (e.g., laminated upon) the body 1502 and/or the cover 1530, or portions thereof, using any suitable coupling (e.g., adhesives). For example, in some embodiments of the present system the covering may include a fabric material (e.g., a jean or denim material or the like) that may be laminated upon, and/or otherwise coupled to, at least an outer surface of the body 1502 and/or cover 1530. It is further envisioned that stitching and/or piping may be provided in one or more locations of the body and/or cover to reinforce the coupling of the fabric material and/or the body or cover and/or to enhance aesthetics.

It is also envisioned that one or more pockets may be coupled to one or more of the body 1502 and/or the cover 1530. For example, a pocket 1578 may be coupled to the one or of the side walls 1518 or end walls 1520 (as shown) so as to form a pocket having an opening 1579 leading to a cavity formed therein and which may be configured to retain a desired object such as a card 1583 or the like. Stitching 1581 may extend adjacent to a periphery of the pocket 1578. The card 1583 may include graphics or text and may be removed by a user. The pocket 1578 may include a flap as may be desired.

The cover 1530 may be shaped and sized so as to cover at least a portion of the cavity 1558 of the body 1502 and may be removably attached to the body 1502 using any suitable method such as an interference fit, a latch, a hinge, etc. Accordingly, the cover 1530 may snugly fit the body 1502 to prevent accidental or inadvertent removal. If desired, an adhesive, tape, seal, etc., may be applied to lock the cover 1530 to the body 1502.

Figure 16:
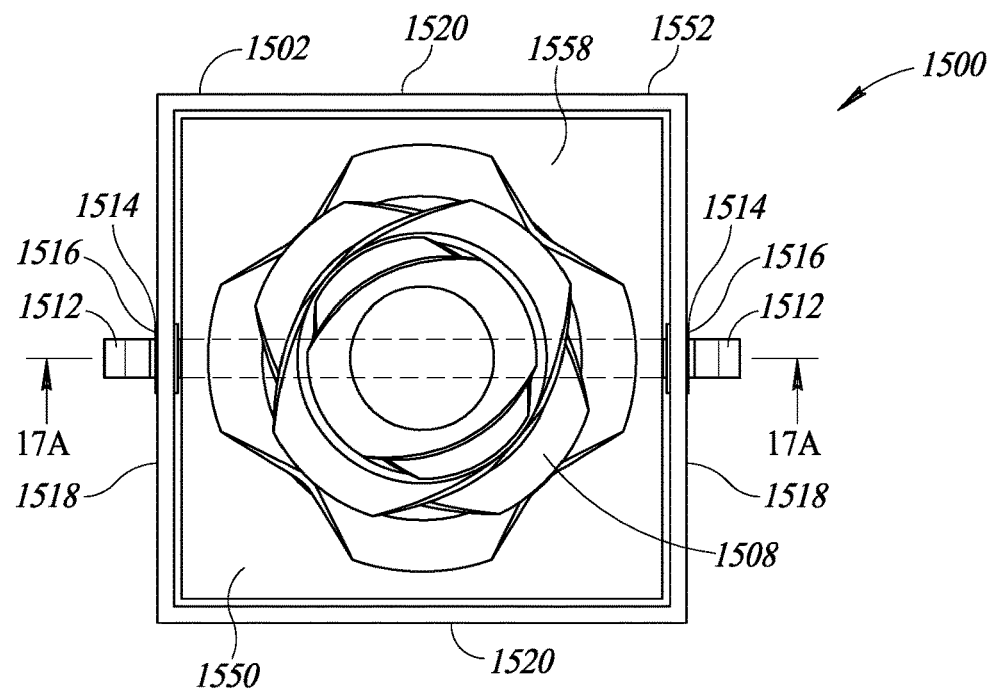
FIG. 16 is a diagram illustrating a top view of a portion of the system of the present invention with the cover removed.

FIG. 16 is a diagram illustrating a top view of a portion of the system 1500 of the present invention with the cover 1530 removed. The flower 1508 may be coupled to the platform 1550 which is situated within the cavity 1558 of the body 1502.

Figure 17A:
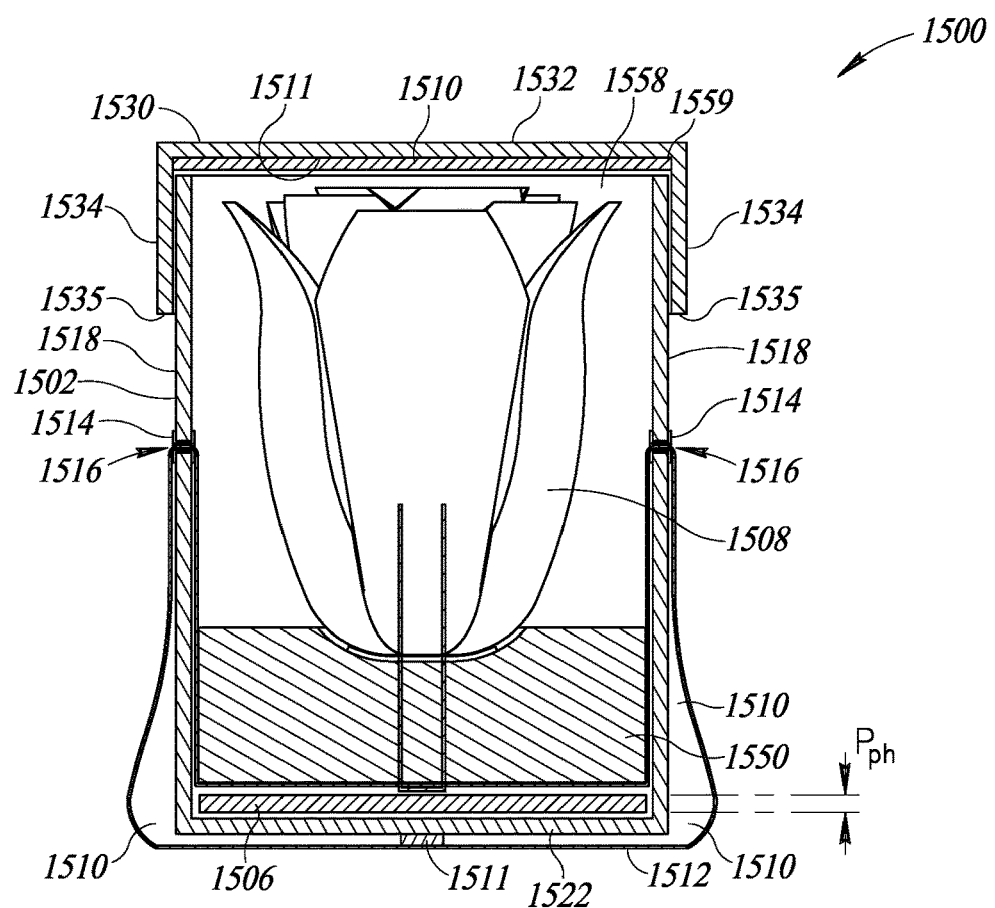
FIG. 17A is a diagram illustrating a cross-sectional view of a portion of the system of the present invention taken along lines 17A-17A of FIG. 16.

FIG. 17A is a diagram illustrating a cross-sectional view of a portion of the system 1500 of the present invention taken along lines 17A-17A of FIG. 16. The body 1502 may include grommets 1514 at corresponding openings 1516 through which the tensioner 1512 may pass. The platform 1550 may be inserted within the cavity 1558 and may be coupled to the tensioner 1512. Accordingly, portions of the tensioner 1512 that are situated within the cavity may be located at least in part between one or more of the platform 1550 and one or more walls (e.g., 1518 and/or 1522) of the body 1502.

The tensioner 1512 may form a loop and may be fixedly or releasably coupled to a wall of the body 1502 such as the bottom wall 1522 using any suitable coupler such as an adhesive 1511. Accordingly, the tensioner 1512 may form one or more exterior loops such as loops 1510 which may be configured to be grasped by user to pull on the tensioner 1512 and/or raise the platform 1550. It is also envisioned that the tensioner 1512 may be discontinuous and may include ends which may be situated outside of the body 1502. In some embodiments, tensioner 1512 may be released from the body 1502 at the adhesive 1511 before raising the platform 1550 as may be desired.

In some embodiments, the tensioner 1512 may be coupled to the platform 1550 similarly to the coupling shown in FIG. 7. For example, the tensioner 1512 may be situated between the platform 1550 and a cap which may be similar to the cap 145 of FIG. 7. One or more adhesive layers or the like may be provided to couple the cap to the platform 1550 and/or the tensioner 1512 directly or via one or more other layers or portions which may intervene.

In some embodiments, one or more pull tabs suitable for grasping by a user may be coupled to, or formed integrally with, the tensioner such that a user may easily grasp the tensioner. For example, the one or more pull tabs may be located at or near the ends of the tensioner or may be attached to other suitable portion or portions of the tensioner.

A puck 1506 may be shaped and sized to fit within the cavity 1558 and may have a height $P_{ph}$ which may be suitable to limit travel of the platform 1550 within the body 1502. Accordingly, the puck 1506 may raise the platform 1550 by the height $P_{ph}$ of the puck 1506 as may be desired. This may be useful for setting a height of the platform 1550 and/or one or more flowers coupled thereto when recessed within the body 1502. It is envisioned that the puck 1506 may be independent of, or may be coupled to, the platform 1550. For example, a coupler 1506 may be coupled to the platform 1550 using any suitable coupler such as an adhesive, a fastener (e.g., a staple, etc.) etc. For example, the puck 1506 may be coupled to the platform 1550 similarly to the method employed to couple the cap 145 to the platform 150 as discussed above. It is further envisioned that the puck 1506 may be independent of the platform 150 and may be optionally coupled to the bottom wall 1522 of the body 1502 using any suitable coupler such as an adhesive 1511.

The insert 1519 may be shaped and sized to fit within a cavity 1590 of the cover 1530 such that it may be placed adjacent to an interior surface 1511 of the top wall 1532 of the cover 1530. The insert 1519 may include one or more layers. For example, the insert 1519 may include a mirror or the like. In accordance with embodiments of the present system, the insert 1519 may include one or more folds such that it may be folded into a booklet or card. In accordance with embodiments of the present system, the insert 1519 may include a surface suitable for writing upon or printing upon.

Figure 17B:
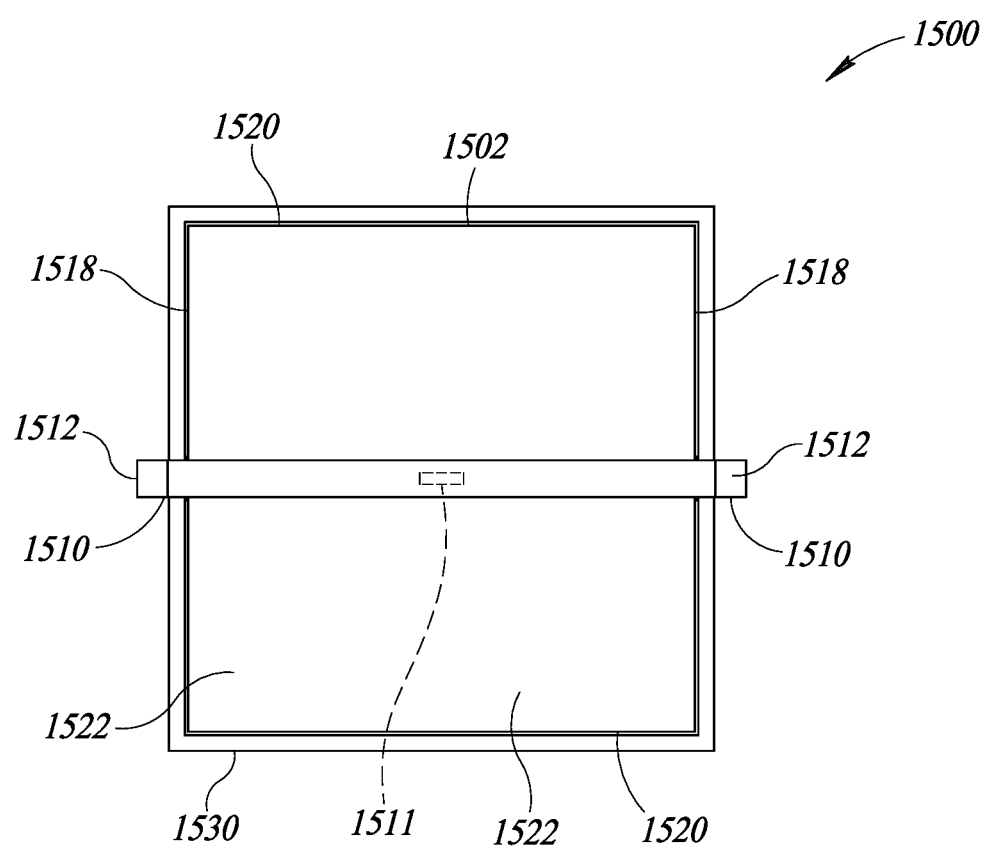
FIG. 17B is a diagram illustrating a bottom view of a portion of the system of the present invention.

FIG. 17B is a diagram illustrating a bottom view of a portion of the system 1500 of the present invention. The tensioner 1512 may extend about and couple to the bottom wall 1522 of the body 1502 using any suitable coupler such as an adhesive 1511.

Figure 18:
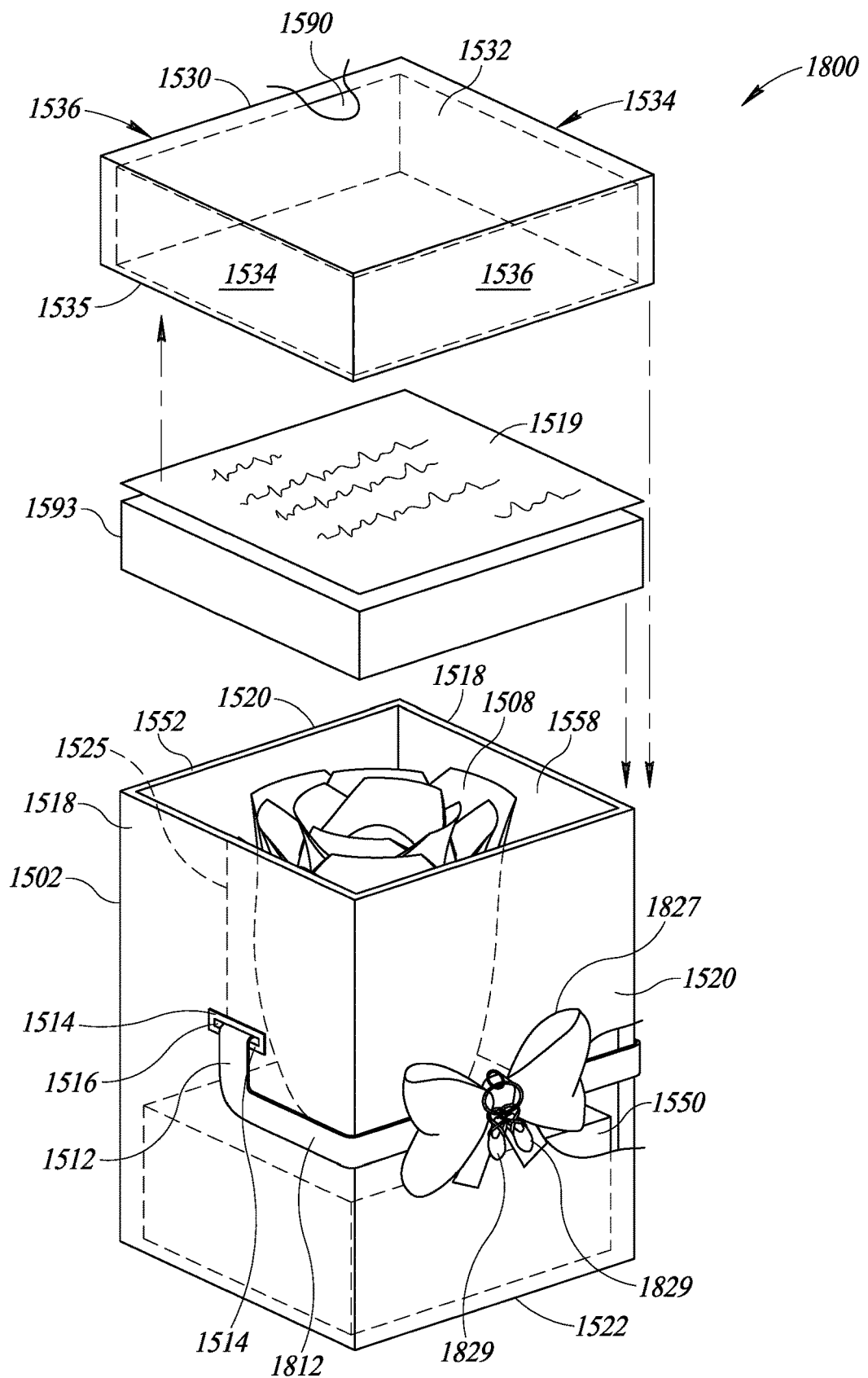
FIG. 18 is a diagram illustrating a partially cutaway and exploded perspective front view of a portion of an example flower container system of the present invention according to a fourth embodiment.

In accordance with embodiments of the invention, the tensioner 1512 may be configured to extend at least partially across one or more of the side walls 1518 and one of the end walls 1520 rather than the bottom wall 1522 of the body 1502 as illustrated in FIG. 15. This is illustrated with reference to FIG. 18 which is a diagram illustrating a partially cutaway and exploded perspective front view of a portion of an example flower container system (hereinafter system 1800 for the sake of clarity) of the present invention according to a fourth embodiment. The system 1800 may be similar to the system 1500 and may include one or more of the body 1502, the flower 1508, the platform 1550, the tensioner 1512, and the cover 1530 as discussed with reference to the system 1500. In some embodiments, it is envisioned that the tensioner 1512 may be configured such that it may pass along one or more of the side wall 1518 and at least one of the end walls 1520 of the body 1502.

Ornamentation such as one or more of a bow, a charm, rings, and/or the like may be attached to, or formed integrally with, the tensioner 1512. For example, a bow 1827 may be coupled to the tensioner 1512 using any suitable fastener. For example, the bow 1827 may be coupled to the tensioner 1512 using an adhesive (e.g., double sided tape, a thermo adhesive, etc.), a thread, a staple, an interference fit, a loop, a pin, etc. It is also envisioned that portions of the tensioner 1512 may be configured to form at least a portion of a bow or the like. It is further envisioned that ornamentation such as a charm 1829 may be coupled to the bow 1827 and/or tensioner 1512. The charm 1829 may include one or more of a ring (e.g., an engagement ring, etc.), a jewel, a shoe (e.g., baby shoes as shown, etc.), a graduation cap, a piece of jewelry, etc. The charm 1829 may be coupled to one or more portions of the tensioner 1512 and/or bow 1827 using any suitable method such as an adhesive (e.g., double sided tape, a thermo adhesive, etc.), a thread, a staple, an interference fit, a loop, a pin, a magnetic coupler, etc. When attaching a bow to the tensioner 1512, it may be desirable to situate portions of the tensioner 1512 on the side 1518 of the body 1502 between the openings 1516 rather than under the bottom wall 1522 of the body 1502.

The optional inner cover 1593 may be situated between the cover 1530 and the body 1502 and may be configured to prevent bleed through between the flower 1508 and portions of the cover 1530 and/or note 1519 situated therein. In some embodiments, it is envisioned that the note 1519 may be coupled to the optional inner cover 1593. The optional inner cover 1593 may be removed from the body 1502 prior to raising the platform 1550 and/or flower 1508 coupled thereto.

Figure 19:
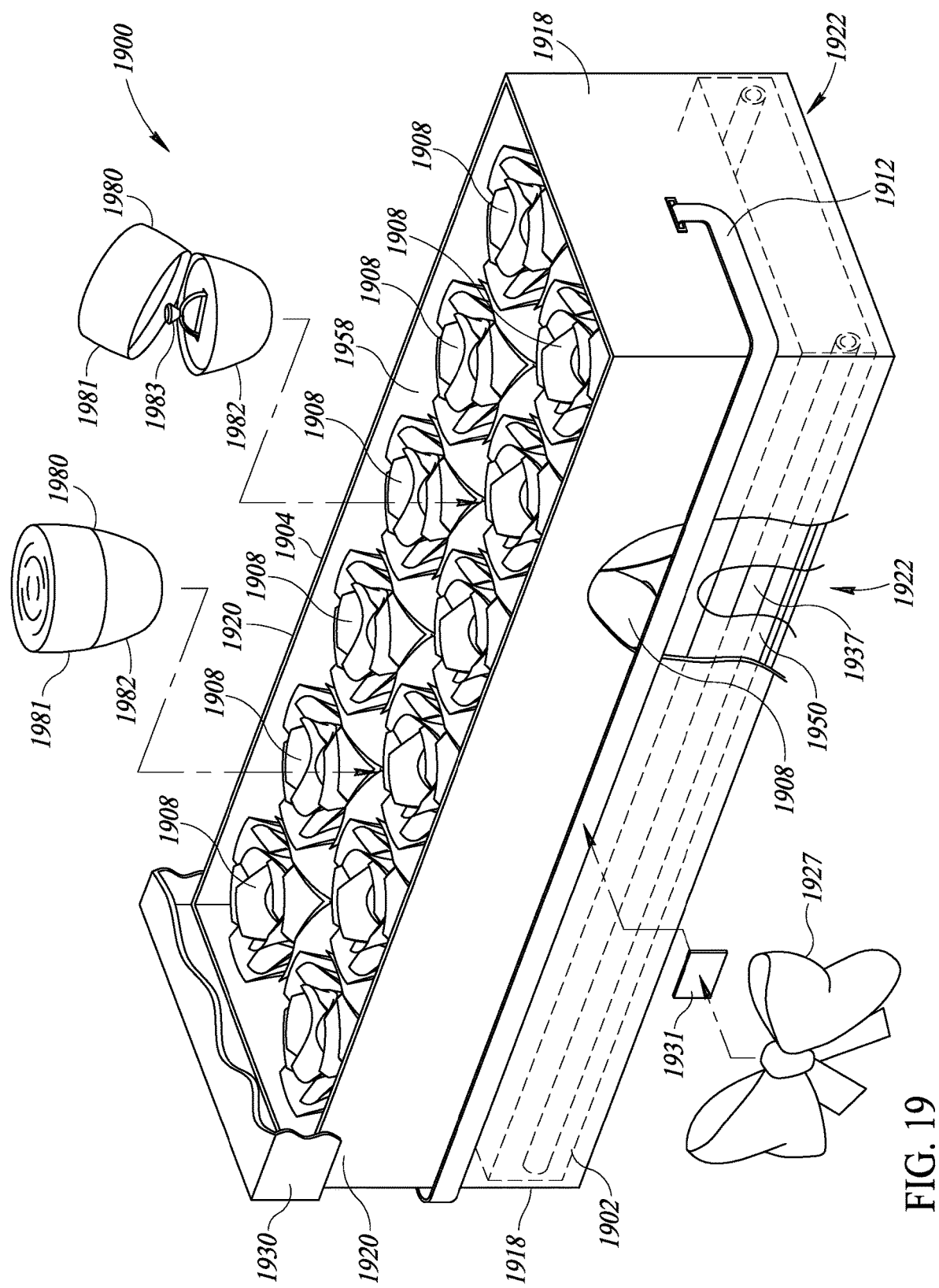
FIG. 19 is a diagram illustrating a partially cutaway and exploded perspective front view of a portion of an example flower container system of the present invention according to a fifth embodiment.

FIG. 19 is a diagram illustrating a partially cutaway and exploded perspective front view of a portion of an example flower container system (hereinafter system 1900 for the sake of clarity) of the present invention according to a fifth embodiment. The system 1900 may include one or more of a body 1902, at least one flower 1908, a platform 1950, a tensioner 1912, and a cover 1930. The body 1902 may include one or more walls such as side walls 1918, end walls 1920, and a bottom wall 1922 which may define at least a portion of a cavity 1958 which may be configured to receive the platform 1950 and the at least one flower 1908 attached thereto.

One or more of the side walls 1918 and end walls 1920 may define at least a portion of a top wall 1904. The body 1902 may form a substantially rectangular shape when viewed from the top.

One or more rigidity enhancing members such as plastic tubes 1937 or the like may be situated within the platform 1950 to increase rigidity of the platform 1950. It is envisioned that the rigidity enhancing member may have other cross-sectional shapes such as "I," "U," "C," "L," etc. In yet other embodiments, the rigidity enhancing member may include one or more layers (polymer or wood such as plywood, etc.) which may be laminated to, or otherwise coupled to, the platform 1950 to enhance rigidity of the platform 1950. The rear view may be similar. Operation may be similar to other embodiments of the present invention.

Those portions of the tensioner 1912 that may be situated outside of the cavity 1958 may pass along one or more of the side walls 1918 and one of the end walls 1920 as shown. In some embodiments, it is envisioned that those portions of the tensioner 1912 that may be situated outside of the cavity 1958 may pass along one or more of the side walls 1981 and the bottom wall 1922. It is further envisioned that portions of the tensioner(s), ribbons, and/or charms may be coupled to one or more portions of the body 1902 using any suitable coupling such as an adhesive, an interference fit, a magnetic coupling, etc.

One or more bows such as bow 1927 and/or one or more charms may be coupled to, or formed integrally with, the tensioner 1912. For example, the bow 1927 may include a pre-formed bow and may be coupled to the tensioner 1912 using any suitable coupler such as an adhesive 1931. The same or a separate coupler may couple one or more of the tensioner 1912 and the bow 1927 to a corresponding portion of the end wall 1920. For example, the adhesive 1931 may be shaped and/or sized such that a portion thereof may extend beyond a periphery of the tensioner 1912 so as to engage a corresponding portion of the end wall 1920. In yet other embodiments, tension within the tensioner 1912 may support that portion of the tensioner 1912 and/or bow 1927 attached thereto in a desired position prior to raising the platform 1950. In yet other embodiments, one or more magnetic couplers (e.g., magnets) may be provided to position the bow 1927 relative to desired portions of the body 1902 prior to and/or after the platform is raised.

In accordance with embodiments of the present system, the system 1900 may include one or more containers such as containers 1980 which may hereinafter be referred to as ring containers 1980 for the sake of clarity. The ring containers 1980 may have any suitable size and/or shape. In some embodiments, the ring containers 1980 may be shaped and/or sized similarly to the flowers 1908 and may be coupled (e.g., releasably) to the platform 1950 using any suitable method or methods such as by an interference fit between adjacent flowers 1908. Accordingly, it is envisioned that one or more of the ring containers 1980 may be removable such as may be desired. For example, a user may remove the ring container 1980 to access contents thereof such as a ring (e.g., an engagement ring) 1983 contained within a cavity 1985 of the respective ring container 1980. In accordance with some embodiments, the ring container 1980 may be coupled to the platform 1950 using magnetic or adhesive coupling methods.

The ring containers 1990 may include a body 1982 which may define at least a portion of the cavity 1985 situated within the body 1982 and which may be configured to hold a desired object such as the ring 1983 (e.g., an engagement ring, etc.). Any suitable coupler such as a pillow, a foam block, etc. may be provided to hold the ring 1983 in position within the cavity 1985. A cover 1981 may be coupled to the body 1982 using any suitable coupler such as a hinge, a screw coupler, an interference fit, etc., and may be configured to cover at least a portion of the cavity 1985 of the body 1982 when closed. In use, it is envisioned that the ring container 1980 may be coupled to the platform and its cover 1981 may be situated in a closed position relative to the body 1982 prior to raising the platform 1950. Thereafter, the platform 1950 may be raised and a user may remove the ring container 1980 and may thereafter open the cover 1981 to reveal contents of the ring container 1980 such as the ring 1983. In some embodiments, it is envisioned that the ring container 1980 may be opened without removing it from the platform 1950.

Figure 21:
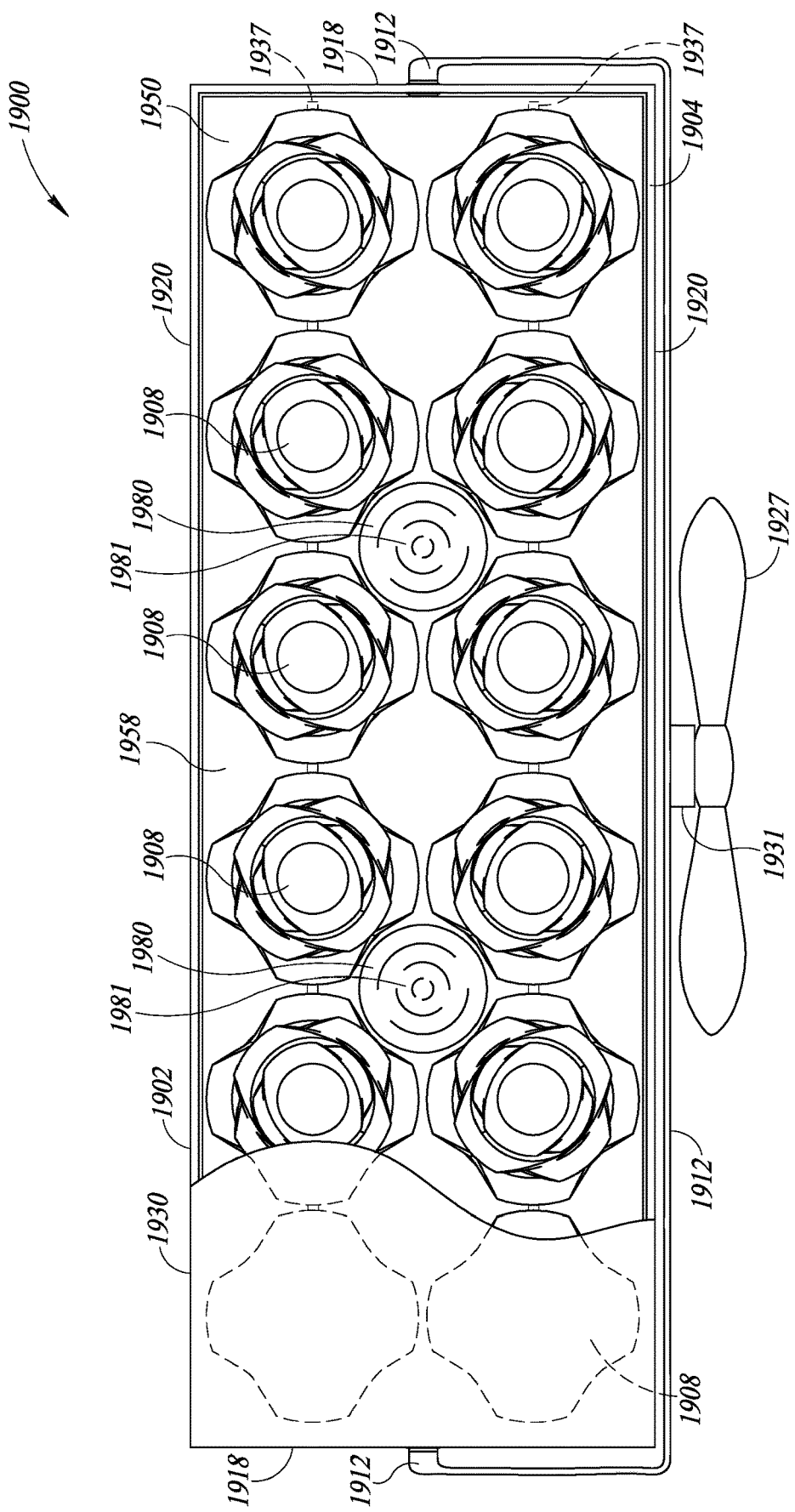
FIG. 21 is a diagram illustrating a partially cutaway top view of a portion of the system of the present invention.

In some embodiments, the tensioner 1912 may have a length suitable and/or may maintain a tension which may support the optional bow 1927 attached thereto at a desired height along a portion of the corresponding end wall 1920. For example, decreasing a length of the tensioner 1912 in that portion that is outside of the body 1902 may increase a height of the optional bow 1927. Conversely, increasing a length of the tensioner 1912 in that portion that is outside of the body 1902 may decrease a height of the optional bow 1927. The size of the tensioner 1912 in that portion that is outside of the body 1902 may be varied to control tension of the tensioner 1912 such that it may provide sufficient tension to support the optional bow 1927 in a desired position at least prior to raising the platform when the platform 1950 is in a desired position (e.g., fully recessed, etc.). FIG. 20A is a diagram illustrating a front view of a portion of the system 1900 of the present invention. The rigidity enhancing members such as the plastic tubes 1937 may extend fully or partially through the platform 1950 which may be inserted with the cavity of the body 1902. FIG. 20B is a diagram illustrating a rear view of a portion of the system 1900 of the present invention. FIG. 21 is a diagram illustrating a partially cutaway top view of a portion of the system 1900 of the present invention. The cover 1930 is partially cutaway to reveal the cavity 1958 and the at least one flower 1908 coupled to the platform 1950 contained therein. The optional containers 1980 may be situated between one or more of the flowers 1908. The containers 1980 may be coupled to one or more of the adjacent flowers 1980 using any suitable coupling such as an interference-type coupling, etc.

In FIGS. 18 through 23, it is envisioned that portions of the tensioner situated outside of the body may run along the front of the body or across the bottom of the body. For example, in accordance with some embodiments, the tensioner may extend along the side walls and the front wall of the body as opposed to extending along at least the side walls and bottom wall of the body.

Figure 22:
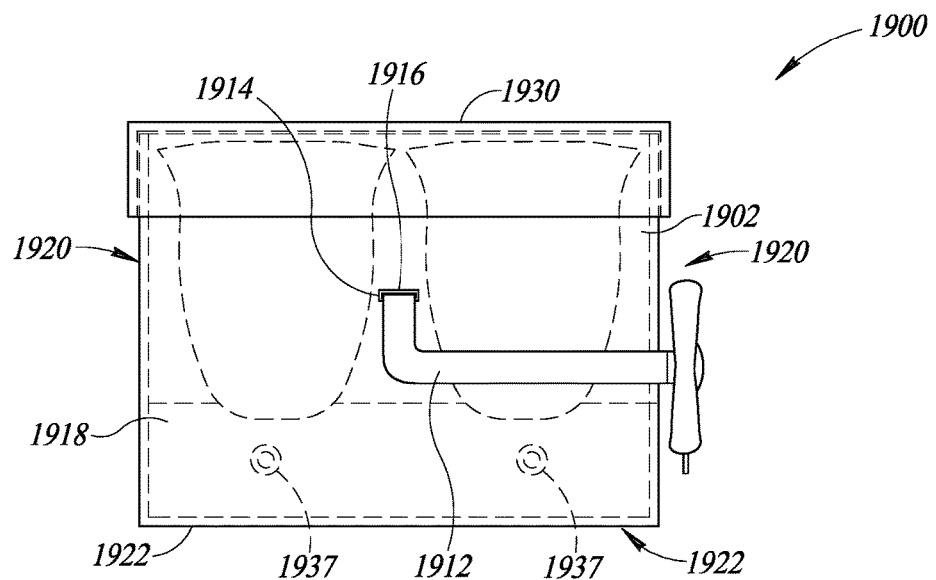
FIG. 22 is a diagram illustrating an end view of a portion of the system of the present invention.

FIG. 22 is a diagram illustrating an end view of a portion of the system 1900 of the present invention. The tensioner 1912 may extend through the opening 1916 and the grommet 1914 situated within the opening 1916. The other end view may be similar.

Figure 23:
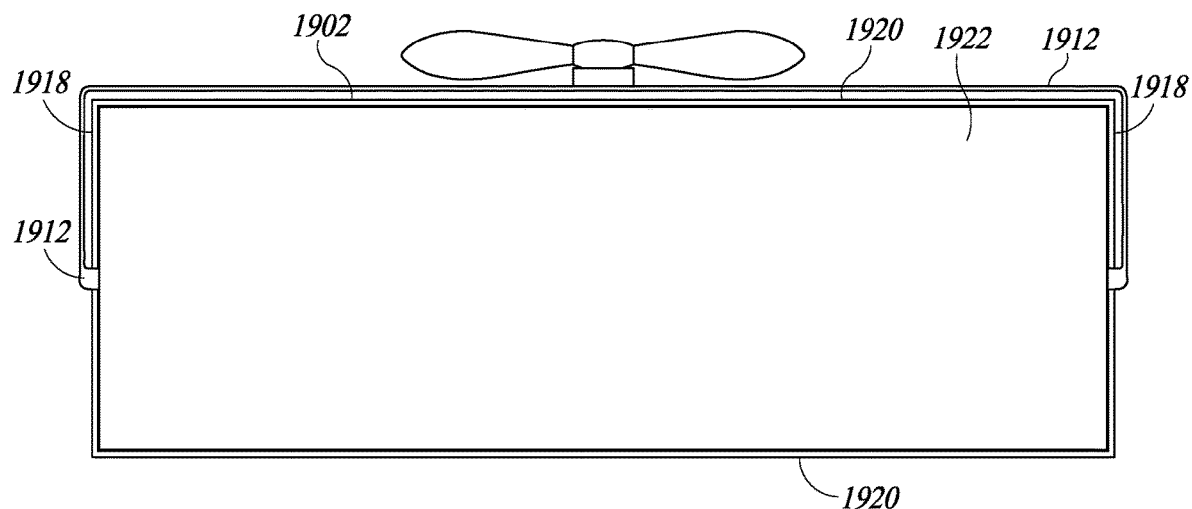
FIG. 23 is a diagram illustrating a bottom view of a portion of the system of the present invention.

FIG. 23 is a diagram illustrating a bottom view of a portion of the system 1900 of the present invention. The tensioner 1912 may extend across and/or be coupled to the bottom wall 1922.

Figure 24:
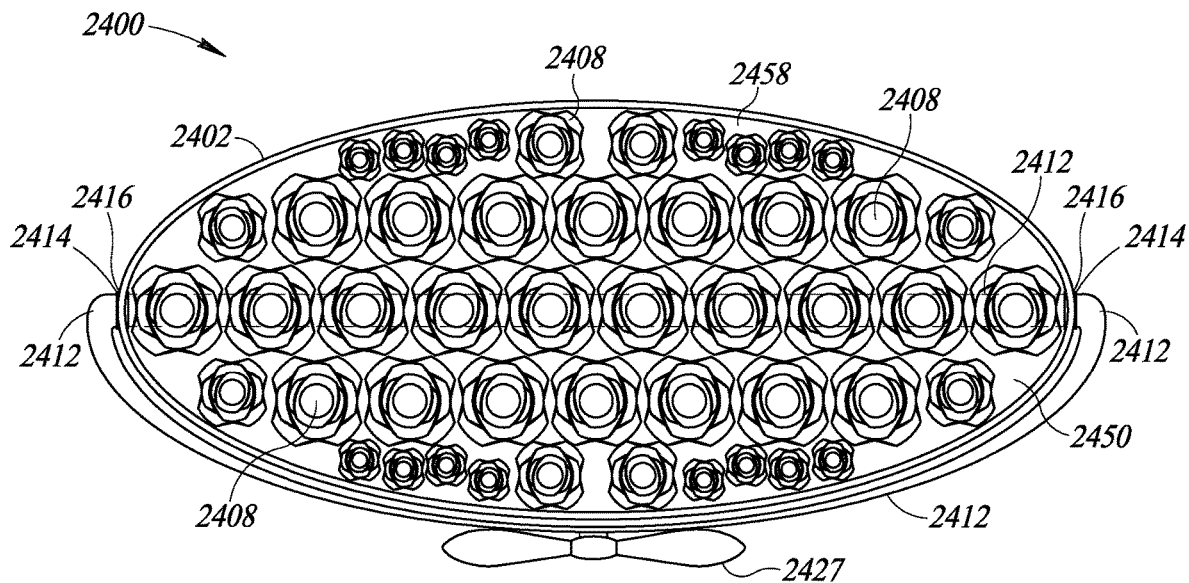
FIG. 24 is a diagram illustrating a top view of a portion of an example flower container system of the present invention according to a sixth embodiment.

FIG. 24 is a diagram illustrating a top view of a portion of an example flower container system 2400 of the present invention according to a sixth embodiment. A body 2402 may have an oval shape when viewed from the top and may include a platform 2450 which may be coupled to at least one flower 2408. The platform 2450 may be shaped and sized similarly to the body 2402 such that it may fit within a cavity 2458 of the body 2402. The platform 2450 may be shaped to receive the at least one flower 2408 and/or an optional ring container. One or more bows 2427 may be coupled to, or formed integrally with, the tensioner 2412.

The platform 2450 may include one or more wells which may be arranged apart from each other as may be desired. For example, the one or more wells may be arranged such that a user may easily and conveniently place the at least one flower 2408 in a desired pattern or patterns. The wells may correspond with a size of a flower to be inserted therein. Accordingly, the wells may have different sizes to receive different types and/or sizes of the at least one flower. In some embodiments, the wells may be situated apart from each other by the same or a different (e.g., varying) distances to correspond with different floral arrangements and/or flower sizes. Further, a top wall of the platform 2450 may have one or more heights to correspond with different types and/or sizes of the at least one flower 2408. The at least one flower 2408 may be located so as to provide an interference fit to couple a container such as an optional ring container.

At least one tensioner 2412 may extend through one or more of openings 1916 and corresponding grommets 1914 situated within each corresponding opening 1916 and may be configured to lift the platform 2450 as discussed elsewhere in this application. A cover is not shown for the sake of clarity.

Figure 25:
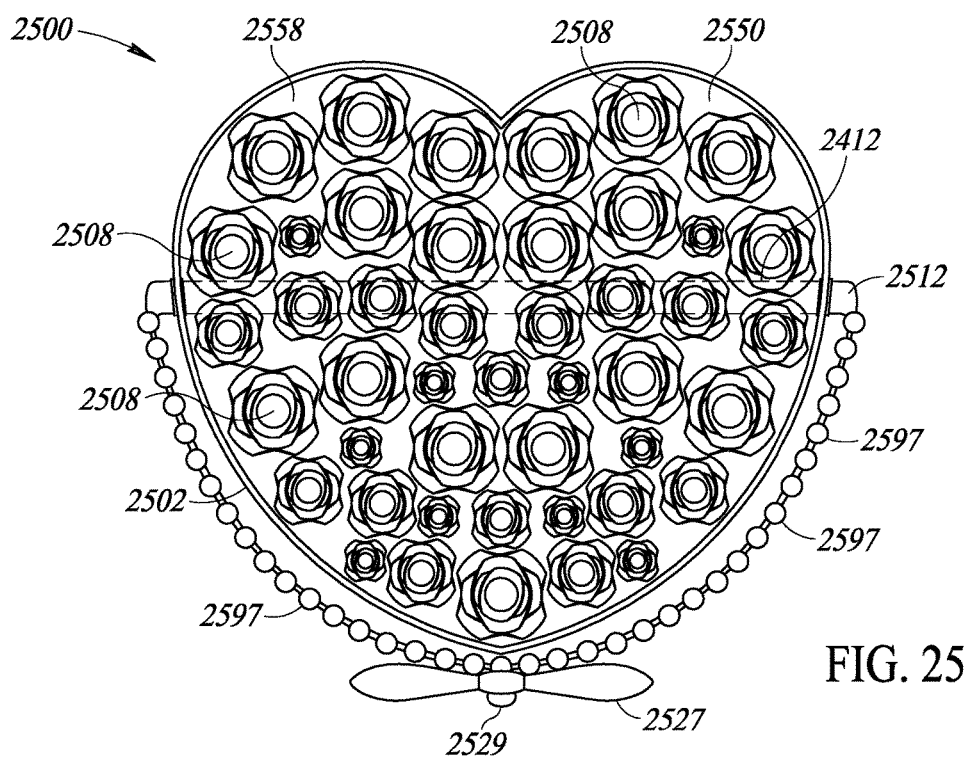
FIG. 25 is a diagram illustrating a top view of a portion of an example flower container system of the present invention according to a seventh embodiment.

FIG. 25 is a diagram illustrating a top view of a portion of an example flower container system 2500 of the present invention according to a seventh embodiment. A body 2502 may have a heart shape when viewed from the top and may include a platform 2550 which may be coupled to at least one flower 2508. The platform 2550 may be shaped and sized similarly to the body 2502 such that it may fit within a cavity 2558 of the body 2502. A cover is not shown for the sake of clarity. One or more optional bows 2527 may be coupled to, or formed integrally with, the tensioner 2512. One or more charms 2529 may be coupled to one or more of the one or more bows 2527 and/or the tensioner 2512. Further, one or more beads 2597 (e.g., real or artificial pearls or the like) or the like may be coupled to the tensioner 2512. For example, at least portions of the tensioner 2512 that are situated outside of the cavity 2558 (e.g., when the platform 2550 is in the fully or substantially recessed position) may be strung through the one or more beads 2597.

It is envisioned that the beads may include an opening to receive the tensioner which may be threaded (or otherwise strung) therethrough. It is also envisioned that the beads may be formed from any suitable material such as stone, bone, shell, metal, ceramic, glass, plastic, wood, or pearl, and/or the like. It is further envisioned that the beads may be formed from organic or synthetic materials. It is envisioned that the beads may have any suitable shape and/or size.

Figure 26:
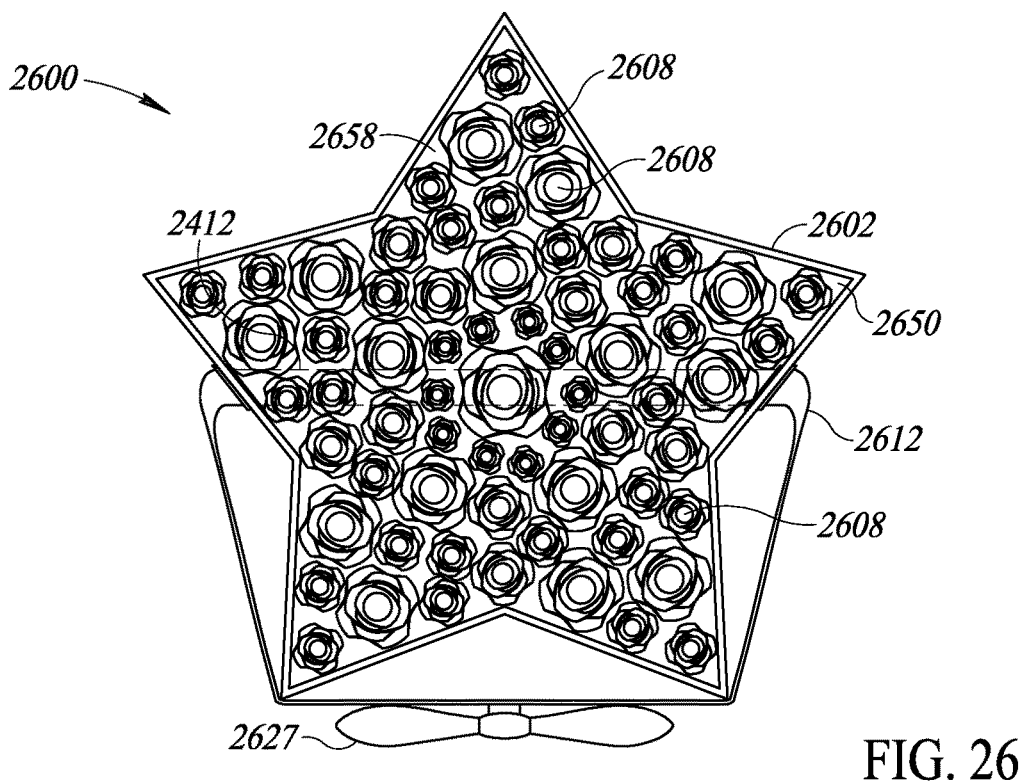
FIG. 26 is a diagram illustrating a top view of a portion of an example flower container system of the present invention according to an eighth embodiment.

FIG. 26 is a diagram illustrating a top view of a portion of an example flower container system 2600 of the present invention according to an eighth embodiment. A body 2602 may have a star shape when viewed from the top and may include a platform 2650 which may be coupled to at least one flower 2608. The platform 2650 may be shaped and sized similarly to the body 2602 such that it may fit within a cavity 2658 of the body 2602. A cover is not shown for the sake of clarity. One or more optional bows 2627 may be coupled to, or formed integrally with, a tensioner 2612.

Figure 27:
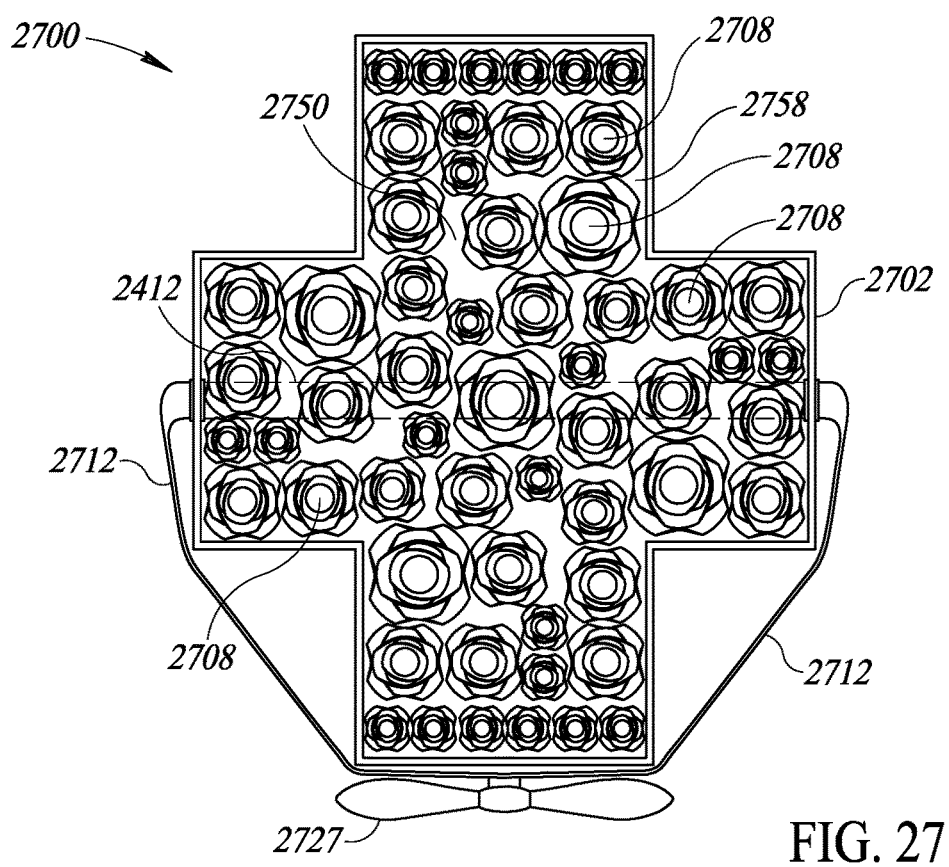
FIG. 27 is a diagram illustrating a top view of a portion of an example flower container system of the present invention according to a ninth embodiment.

FIG. 27 is a diagram illustrating a top view of a portion of an example flower container system 2700 of the present invention according to a ninth embodiment. A body 2702 may have a cross shape when viewed from the top and may include a platform 2750 which may be coupled to at least one flower 2708. The platform 2750 may be shaped and sized similarly to the body 2702 such that it may fit within a cavity 2758 of the body 2702. A cover is not shown for the sake of clarity. One or more optional bows 2727 may be coupled to, or formed integrally with, a tensioner 2712.

Figure 28:
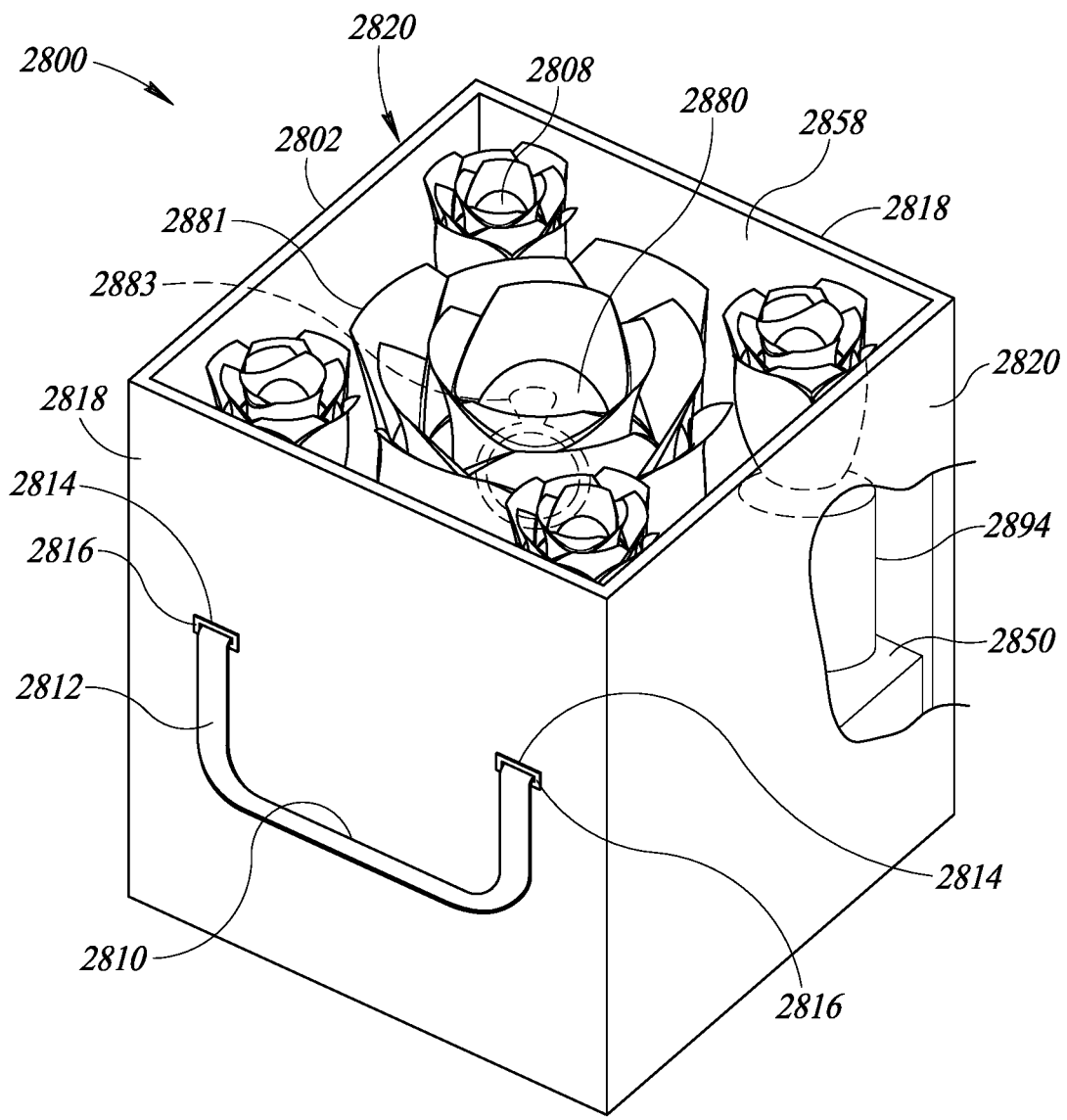
FIG. 28 is a diagram illustrating a perspective front view of a portion of an example flower container system of the present invention according to a tenth embodiment.

FIG. 28 is a diagram illustrating a partially cutaway perspective front view of a portion of an example flower container system (hereinafter system 2800 for the sake of clarity) of the present invention according to a tenth embodiment. The system 2800 may include one or more of a body 2802, at least one flower 2808, a platform 2850, and at least one tensioner 2812. A cover is not shown for the sake of clarity.

The body 2802 may include one or more of the side walls 2818 each of which may include a one or more openings such as openings 2816 which may be configured to receive, and or to provide passage of, corresponding portions of the at least one tensioner 2812 which may pass therethrough. One or more of the openings 2816 may include a grommet 2814 or the like (e.g., a cringle, an eyelet, etc.) through which the tensioner 2812 may pass. The openings 2816 in each of the side walls 2818 may be spaced apart from each other and may be aligned with, or offset (e.g., slightly) from the openings 2816 at the other side wall 2818. The tensioner 2812 may form a loop which may pass through each of openings 2816 in each of the side walls 2818 such as loops 2810 suitable for grasping by a user each of which may be situated at each corresponding side wall 2818 at the exterior side of the body 2802. The side walls 2818 and opposed end walls 2820 may define at least a portion of a cavity 2858 configured to receive the platform 2850 and the at least one flower 2808 attached thereto.

The platform 2850 may be raised in certain areas such as at area in which flowers 2808 having a smaller size may be located such that a desired height and/or uniformity of the flowers 2808 may be obtained. For example, the platform may be configured with a surface that may include various heights or may include blocks or pedestals 2894 coupled thereto which may be configured to raise a mounting surface upon which one or more of the flowers 2808 may be mounted as shown.

One or more ring containers 2880 may be coupled to the combination formed by the platform 2850 and/or the flowers 2850 using any suitable coupling such as an interference fit between the one or more ring containers 2880 and adjacent ones of the flowers 2850. In some embodiments, other couplings are also envisioned such as a releasable fastener (e.g., a hook-and-loop type fastener such a Velcro™, etc.), a magnetic fastener, an adhesive fastener, etc. The ring container 2880 may include cavity configured to receive a ring 2883 (e.g., an engagement ring, etc.) contained therein. The one or more ring containers 2880 may include a cover 2881 which may open to reveal the cavity. Exterior portions of the ring container 2880 such as at least the cover 2881 may be shaped, sized, and/or colored to match a desired flower pattern, size, and/or color, respectively. For example, the exterior portions of the ring container 2880 such as at least the cover 2881 may be embossed to simulate the look of a desired flower such as a rose and may include a desired color (e.g., red, etc.).

Figure 29:
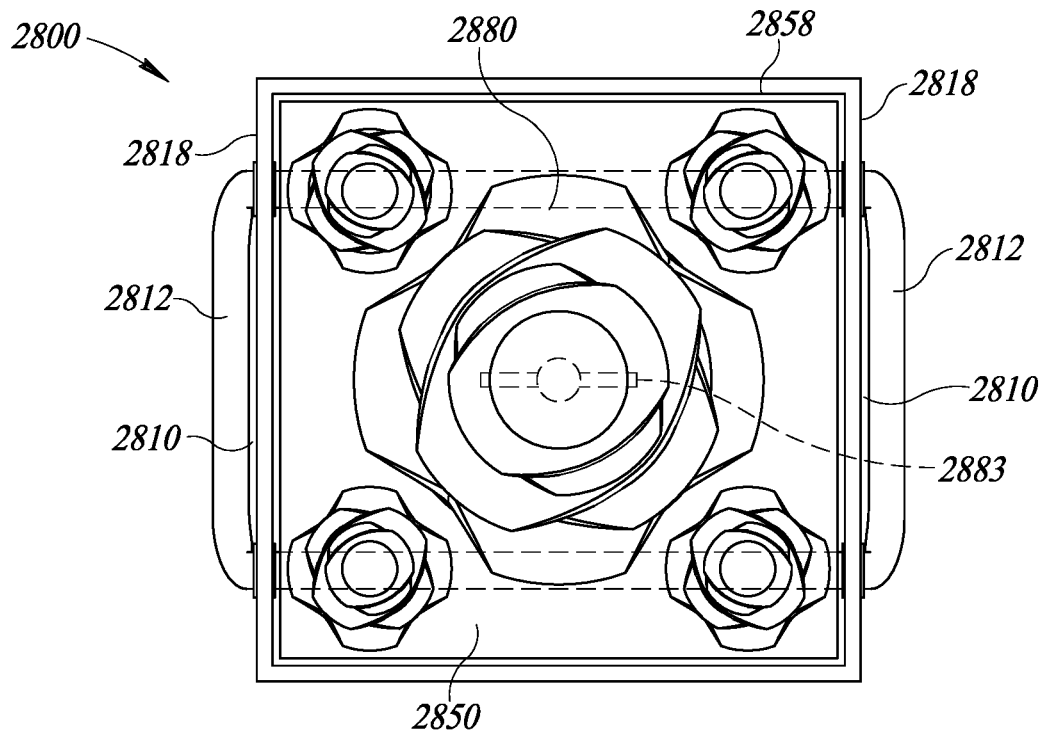
FIG. 29 is a diagram illustrating a top view of a portion of the system of the present invention.

FIG. 29 is a diagram illustrating a top view of a portion of the system 2800 of the present invention. The openings (e.g., 2816 FIG. 28) in each of the side walls 2818 may be spaced apart from each other and situated opposite openings (e.g., 2816 FIG. 28) in the opposite side wall 2818 such that the tensioner may be have parallel or substantially parallel runs adjacent to platform 2850. It is envisioned that adjacent portions of the tensioner 2812 may be parallel or non-parallel as may be desired. The cover is not shown for the sake of clarity. The tensioner 2812 may form one or more loops such as the loops 2810 at each exterior side of the body 2802. These loops 2810 may be configured to be grasped by a user and may be pulled in opposite directions to tension the tensioner 2812 and raise the platform 2850 within the cavity 2858 of the body 2802.

Figure 30:
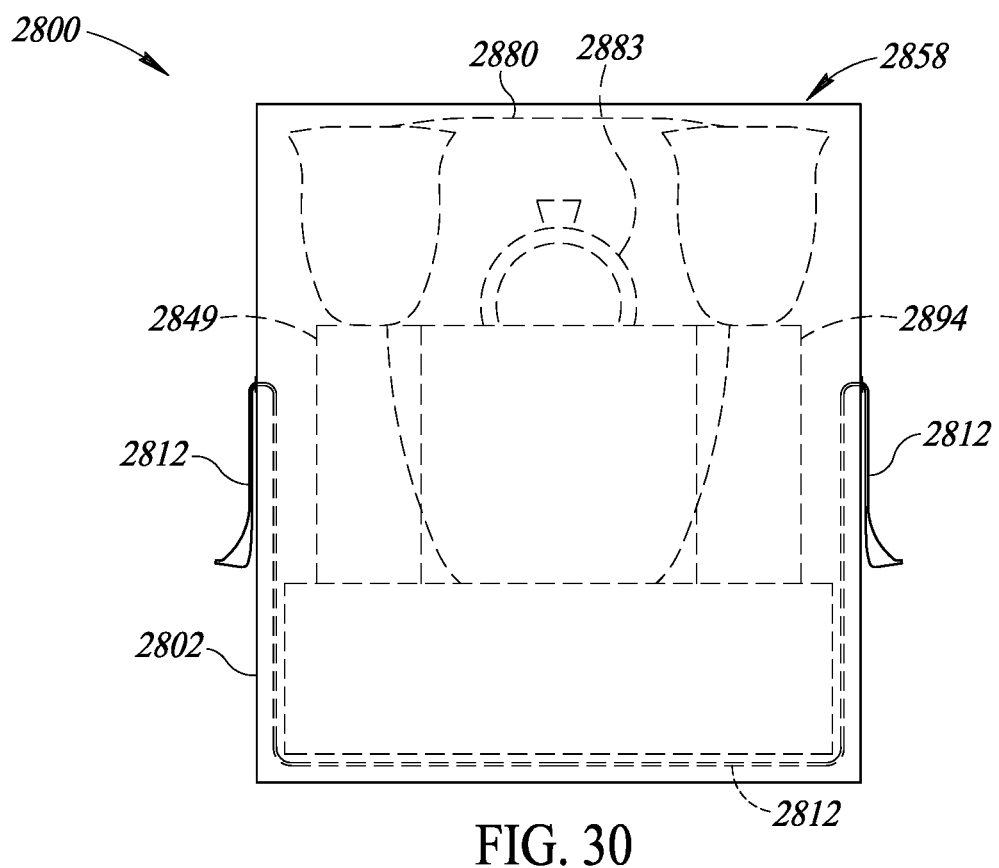
FIG. 30 is a diagram illustrating a side view of a portion of the system of the present invention.

FIG. 30 is a diagram illustrating a side view of a portion of the system 2800 of the present invention. The pedestals 2894 may be coupled to the platform 2850 to raise a mounting surface upon which one or more of the flowers 2808, such as smaller corner flowers 2808 situated in corners of the cavity 2858. The pedestals 2894 may be coupled to (e.g., using an adhesive, etc.), or formed integrally with, the platform 2850. The flowers 2808 may be coupled to the pedestals 2894 using any suitable method (e.g., adhesives, staples, etc.). The pedestals 2894 may include wells to position the flowers 2808 mounted thereto which may be similar to the wells of the platform 2850.

Each of the wells may include a graphical depiction of a flower to be inserted within. This graphical depiction may be printed or may be embossed in the corresponding well. For example, a well configured to receive a rose may have a rose shape or a depiction of a rose while a well configured to receive a tulip may have a shape or a depiction of a tulip. This may aid in the formation of a desired floral arrangement if desired.

Figure 31:
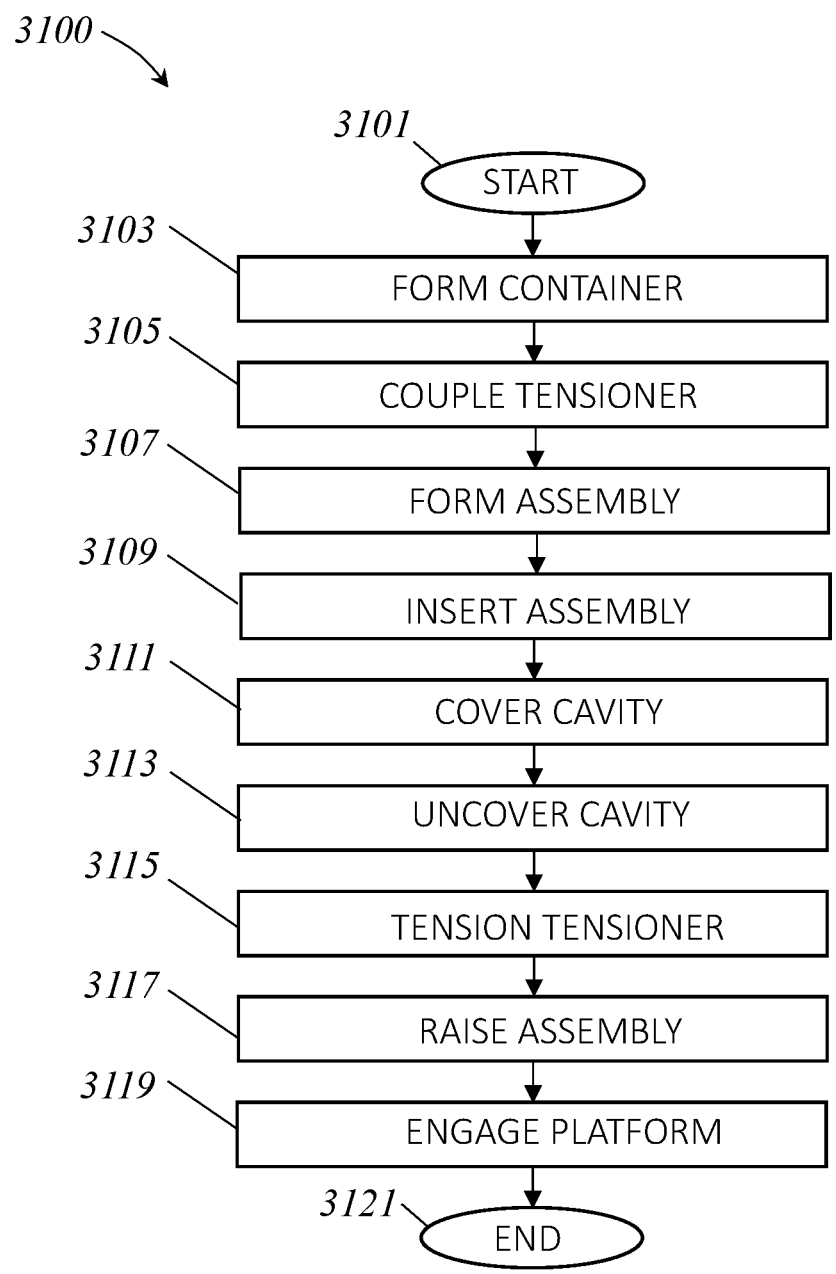
FIG. 31 is a flowchart which shows a portion of a process to form a flower container in accordance with embodiments of the present invention.

A method to form and/or use flower container in accordance with embodiments of the present invention will now be discussed with reference to FIG. 31; wherein FIG. 31 is a flowchart 3100 which shows a portion of a process to form a flower container in accordance with embodiments of the present invention. The process may be performed using one or more logic devices (e.g., controllers, processors, microprocessors, shift registers, gates, circuits, etc.) communicating over any suitable medium (e.g., a network) to obtain information from, and/or store information to, one or more memories which may be local and/or remote from each other. The process 3100 may communicate with one or more actuators and/or sensors. For example, the process may control one or more actuators or the like (e.g., motors (e.g., linear, rotary, robotic, etc.), solenoids, etc.) to perform desired actions to complete steps or acts (hereinafter both of which may be referred to as steps or acts) of the process and/or to form a container suitable for displaying articles such as flowers and the like in accordance with embodiments of the present system. The process may further receive feedback information from the one or more sensors (e.g., location sensors, proximity sensors, temperature sensors, orientation sensors, location sensors, image sensors, position sensors, optical sensors, angular displacement sensors, etc.) and act in accordance with the sensor information to perform acts in accordance with the process. It is envisioned that the process may control one or more robotic manipulation portions to perform acts of the process and/or may receive sensor information from the one or more manipulation portions. Thus, the process may control actuator of the robotic manipulation portions. The process may include one or more of the steps discussed below and may differ from the order in which they are described as may be desired with appropriate discretion. One or more of the following steps may be combined, separated into one or more sub-steps as may be desired, and/or may be skipped depending upon system and/or user settings. During the process, information generated and/or obtained by the process may be encrypted and/or stored for a desired duration (e.g., for a desired period of time) or longer as may be desired in a memory of the system. The process may start during step 3100 and then proceed to step 3103. For the sake of clarity, although only a single flower and platform will be discussed, it should be understood that a plurality of flowers and/or platforms may be employed in accordance with embodiments of the present system. Further, the process may be repeated a plurality of times. It is envisioned that the process 3100 may be operative to build a container in accordance with container build information (CBI) as discussed below with respect FIG. 32.

During step 3103, the process may form a container having a body which defines a cavity configured to receive an assembly including a platform and a flower attached thereto. The body may have one or more side walls which may define at least a portion of the cavity which may be configured to receive the assembly and provide for telescopic motion of the assembly relative to the one the one or more side walls. During this act, the process may further form one or more openings and/or corresponding insertion slits into the one or more side walls. The one or more openings may be suitable for receiving a grommet and/or a tensioner inserted therethrough. For example, the grommets may be inserted and secured to corresponding ones of the one or more openings.

The process may further form the grommets which may be coupled to, or formed integrally with, the body during the current step and/or other steps of the process. For example, if the body is formed from a plastic material, it may be heated to thermoform at least a portion of the grommets. It is envisioned that a spacer such as puck may be inserted into the cavity if desired. It is envisioned that the process may further form and/or obtain the body, the platform, the tensioner, the flower, the grommets, and/or other portions employed by embodiments of the present system. The platform may be configured to correspond with a shape and size of the cavity of the body so as to be operative with the body in accordance with embodiments of the present invention. After completing step 3103, the process may continue to step 3105.

During step 3105, the process may couple a tensioner to the platform. Accordingly, the process may insert portions of the tensioner into corresponding openings of the body (and/or through corresponding grommets) and may secure ends of the tensioner to the platform. For example, the free ends of the tensioner may be threaded through openings of the body (and/or through grommets placed in the respective opening) and thereafter coupled to the at least one platform to form a loop.

In some embodiments, the tensioner may be passed through the correspond openings of the body and the platform may be coupled to portions of the tensioner. The tensioner may have unattached opposed ends or may be formed into a loop and may be coupled to the platform. It is envisioned that the tensioner may be coupled (e.g., fixedly or slidably) to the platform. Ends of the tensioner may be joined or otherwise coupled using any suitable method such as a lap joint, a but joint, etc. After completing step 3105, the process may continue to step 3107.

During step 3107, the process may form the assembly including the platform and the flower attached thereto. Accordingly, the process may control any suitable coupling device to couple the flower (or flowers) to the platform using any suitable method such as adhesives, staples, etc. It is envisioned that prior to coupling the flower to the platform, the process may control a robotic manipulation portion to align the flower to the platform. Thereafter, the robotic manipulation portion may couple the flower to the platform. The robotic manipulation portion may couple one or more optional ring containers to the platform and/or the flower (or flowers). After completing step 3107, the process may continue to step 3109.

During step 3109, the process may insert the assembly including the platform and the flower (and/or optional ring container(s)) into the cavity of the body. The assembly may be placed in a fully recessed position (e.g., as opposed to a display position for displaying the flower). The platform may be loaded from the top or from the bottom of the body. When inserting the platform into the body, it will be assumed that the bottom wall of the body is not attached and may be attached thereafter. The process may further insert any suitable pucks if desired to adjust a height of the platform relative to the body. After completing step 3109, the process may continue to step 3111.

During step 3111, the process may cover (e.g., close) the cavity of the body using any suitable method. For example, the process may install, or otherwise position, an optional cover on the body using any suitable method to cover an opening to the cavity of the body. Depending upon cover type, the cover may fit using a male or a female interference fit. In some embodiments it is envisioned that the cover may be hinged or otherwise coupled to the body. In some embodiments, the cover may be formed from a film (e.g., a polymer film or the like having one or more layers, etc.) which may be coupled to the body using any suitable method such as adhesives, friction or thermo welding, etc.

The cover may include a cavity in which an insert (e.g., a card, a mirror, etc.) may be placed. This insert may include graphics, text, an electronic greeting card, etc. and may include an area for receiving a note, text, and/or graphics. The process may print and/or form all or part of the insert. For example, the process may generate a card or note on an insert and/or may couple the insert to the cover in accordance with embodiments of the present system. After completing step 3111, the process may continue to step 3113. At this point, the container including the platform and the flower may be completed.

During step 3113, the cavity (of the body) may be uncovered (e.g., opened) by manipulating the optional cover, or portions thereof, to expose the cavity of the body using any suitable method. For example, the cover may be removed or may be opened to expose the cavity of the body. If the cover comprises a film all or a portion thereof may be peeled away from the body and/or any portion of the cover which is to remain coupled to the body. After competing step 3113 the process may continue to step 3115.

During step 3115, the tensioner may be tensioned using any suitable method. For example, tension may be applied to one or more ends or portions of the tensioner that are outside of the cavity of the body such that a force may be applied via the tensioner to the platform. This force may telescopically raise the platform relative to the body. For example, the tensioned tensioner may transfer a force from a support point at a side wall of the container to the platform of the assembly. After completing step 3115, the process may continue to step 3117.

During act 3117, the assembly may be raised such that at least a portion of the flower and/or platform may be raised out of the cavity of the body by a desired amount so as to be fully or substantially raised from the cavity of the body as discussed elsewhere in this application. When fully or substantially raised, at least a portion of the flower and/or a portion of the platform may be raised above a cavity or top wall of the body depending upon a desired configuration of the assembly and/or the body. In accordance with some embodiments, a user may raise the platform by a desired amount. After completing step 3117, the process may continue to step 3119.

During step 3119, the process may engage the platform to secure it relative to the body. For example, an interference fit between adjacent portions of the body and the platform may secure the platform in the fully or substantially raised position relative to the body. It is envisioned that any suitable method to engage the platform in the fully or substantially raised position such as an interference fit, a tab and/or a notch, dimpling, a magnetic lock, etc. (which may be actively or passively activated) may be provided to lock the platform in position relative to the body. In yet other embodiments, it is envisioned that the platform lock may be engaged at other positions as may be desired. After completing step 3119, the process may continue to step 3121 where it may end.

Figure 32:
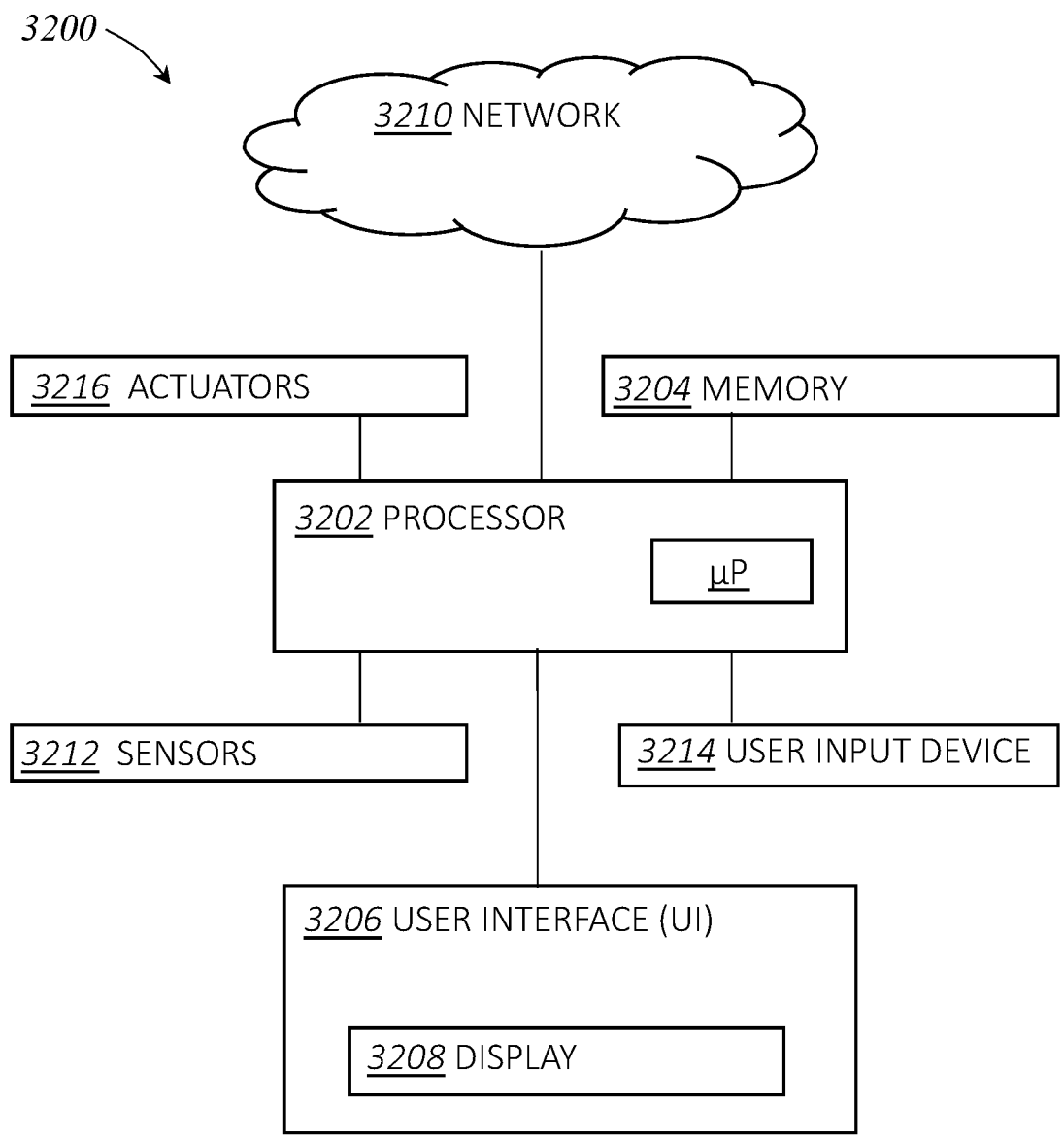
FIG. 32 is a diagram illustrating a schematic view of a portion of an example system in accordance with embodiments of the present invention.

FIG. 32 is a diagram illustrating a schematic view of a portion of an example system 3200 (hereinafter system 3200) in accordance with embodiments of the present invention.

In accordance with some embodiments, a portion of the present system may include one or more of a processor 3202 operationally coupled to a memory 3204, a user interface (UI) 3206 including a rendering device such as a display 3208 or the like, sensors 3212, a communication network 3210, a user input device 3214, and actuators 3216, communicatively coupled to each other. In accordance with some embodiments, portions of the system 3200, such as one or more of the processor 3202, the memory 3204, the user interface (UI) 3206, the sensors 3212, the communication network 3210, the user input device 3214, and/or the actuators 3216, may be distributed over a network such as the network 3210.

The processor 3202 may control the overall operation of the system 3200 and may include one or more logic devices such as processors, controllers, micro-processors (μPs), shift registers, gates, circuits, and/or the like. These logic devices may be local or distributed throughout the system 3200. using one or more logic devices The memory 3204 may include any suitable memory such as non-volatile memories, etc. The memory 3204 may include one or more memories which may be local and/or distributed. For example, the memory 3204 may include a distributed memory such as a cloud storage network and/or the like.

The UI 3206 may include any suitable rendering device which may render information generated by the system 3200 for the convenience of the user such as a display (e.g., the display 3208), a speaker, a haptic device (e.g., a vibrator, etc.), and/or the like. For example, the display 3208 may include a touchscreen display.

The sensors 3212 may include any suitable sensor or sensors which may sense information, generate corresponding sensor information, and/or may provide this sensor information to the processor 3202 for further analysis in accordance with embodiments of the present system. The sensors 3212 may include, for example, one or more of temperature sensors, pressure sensors, optical sensors, image sensors, lighting sensors, rotational sensors, position sensors, acceleration sensors, velocity sensors, etc. each of which may sense corresponding information and generate corresponding sensor information. For example, the temperature sensors may sense temperature at one or more portions of the system 3200 and generate corresponding temperature information while a position sensor may sense position of one or more portions of the system 3200 and generate corresponding position information. Then the generated sensor information may then be provided to the processor 3202 for further processing.

The communication network 3210 may include any suitable communication network which may communicatively couple one or more of the processor 3202, the memory 3204, the user interface (UI) 3206, the sensors 3212 the user input device 3214, and/or the actuators 3216 to each other. The communication network 3210 may include any suitable wired and/or wireless communication network such as a local area network (LAN), a wide-area network (WAN), the Internet, an intranet, a proprietary network, an ad-hoc network, a telephony network, a cellular network, a bus, a controller area network (CAN) bus, etc.

The actuators 3216 may include one or more actuators such as linear actuators, rotary actuators, solenoids, motors, pneumatic actuators, hydraulic actuators, magnetic actuators, positioning actuators, fillers, labelers, etc. which may change position, rotation, and/or orientation of portions of the system 3200 and/or a container or portions thereof such as inserts, flowers, platforms, tensioners, bodies, covers, etc. For example, the actuators 3216 may include a robotic actuator which may manipulate one or more portions of the system along or about one or more axes and/or to obtain, manipulate and/or form one or more portions of a container in accordance with embodiments of the present system.

The user input device 3214 may include any suitable device with which a user may enter, input, or select information such as a touch-screen display or touch-sensitive display, a keyboard, a mouse, a trackball, a microphone, a camera or image sensor, etc., which may be stand alone or part of the system 3200, such as part of a personal computer, a personal digital assistant (PDA), a mobile phone (e.g., a smart phone), a monitor, a tablet (e.g., an IPAD™ etc.), a smart or dumb terminal or other device for communicating with the processor 3202 via any operable link such as a wired and/or wireless communication link via the network 3210.

The user input device 3214 be operable for interacting with the processor 3202 including enabling interaction within the UI 3206 as described herein. It is envisioned that one or more of the processor 3202, the memory 3204, the user interface 3206, the sensors 3212, the actuators 3216, and/or user the input device 3214 may form at least a portion of a computer system or other device such as a client and/or server device. It is further envisioned that one or more of the processor 3202, the memory 3204, the user interface 3206, the sensors 3212, the actuators 3216, and/or user the input device 3214 may form a node in a computer system having a plurality of nodes.

It is envisioned that methods of the present system may be particularly suited to be carried out by a computer software program, such program including modules corresponding to one or more of the individual steps or acts described and/or envisioned by the present system. Such program may be embodied in a computer-readable medium, such as an integrated chip, a peripheral device or memory, such as the memory 3204 or other memory coupled to the processor 3202.

The program and/or program portions contained in the memory 3204 may configure the processor 3202 to implement the methods, operational acts, and functions disclosed herein. The memories may be distributed, for example between the clients and/or servers, or local, and the processor 3202, where additional processors may be provided, may also be distributed or may be singular. The memories may be implemented using any suitable storage device or method such as electrical, magnetic, or optical memory, or any combination of these or other types of storage devices. Moreover, the term "memory" should be construed broadly enough to encompass any information able to be read from or written to an address in an addressable space accessible by the processor 3204. With this definition, information accessible through a network such as the network 3210 may still be within the memory 3204, for instance, because the processor 3202 may retrieve the information from the network 3210 for operation in accordance with the present system.

Operation acts performed by the system 3200 may include obtaining sensor information from one or more of the sensors 3212, analyzing the sensor information, and controlling the one or more actuators 3216 to manipulate and/or form at least a portion of a container in accordance with container build information (CBI) and the sensor information in accordance with embodiments of the present system. The CBI may be set by the system and/or user and may be stored in a memory of the system 3200 such as the memory 3204 for later use. The CBI may set forth instructions for use by the system 3200 to generate at least one corresponding container.

The CBI may include information related to, for example, container size (e.g., small, medium, large, etc.), shape, (e.g., circular, oval, cross, star, heart shaped, etc.), color (e.g., blue, red, silver, etc.), number of flowers (e.g., 1, 4, etc.), type of flowers (e.g., rose, iris, marigold, etc.), colors of flowers, type of tensioner (e.g., rope, cable, beaded, etc.), color of tensioner or portions thereof (e.g., blue, silver, white pearls, etc.), insert print (e.g., text, graphics, etc. of insert), insert style (e.g., round, square, etc.), insert material, insert color, etc.

Accordingly, it is envisioned that the controller 3202 may generate a GUI (e.g., which may be referred to as a CBI selection GUI) with which the user may select and/or set the CBI or portions thereof. For example, the CBI selection GUI may include a plurality of selection items for the user to select information related to the CBI such as the container size (e.g., small, medium, large, etc.), container shape, (e.g., circular, oval, cross, star, heart shaped, etc.), container color (e.g., blue, red, silver, etc.), number of flowers (e.g., 1, 4, etc.), type of flowers (e.g., rose, iris, marigold, etc.), colors of flowers, type of tensioner (e.g., rope, cable, beaded, etc.), color of tensioner or portions thereof (e.g., blue, silver, white pearls, etc.), insert (e.g., text, graphics, etc. of insert.). Once selected, the system 3200 may store the completed CBI in the memory 3204 for later use such for building a container in accordance with the CBI.

In accordance with embodiments of the present system the tensioner may have first and second ends. The first end or portion of the tensioner may be fixedly coupled to a wall of the body such that tension may be applied between the tensioner and the body. A height at which this coupling is fixed should be sufficient to fully raise a platform coupled to the tensioner to the fully or substantially raised position relative to the body. Accordingly, when tension is applied to the tensioner (e.g., by pulling on only a single end of the tensioner), this tension may result in a force being applied to the platform so as to raise the platform and a flower attached thereto to the fully or substantially raised position.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A container, comprising:
at least one tensioner;
a platform configured to be coupled to the at least one tensioner and at least one flower;

a body having at least one wall defining at least a portion of a cavity configured to receive the platform and a first opening leading to the cavity; and a plurality of openings situated in the at least one wall and configured to receive the at least one tensioner such that a portion of the at least one tensioner is situated in the cavity and is configured to be pulled through a corresponding one of the plurality of openings to urge at least a portion of the platform from the cavity towards or through the first opening.

2. The container according to claim 1, wherein the at least one tensioner is coupled to the platform to form a corresponding loop therewith.

3. The container according to claim 2, wherein a portion of the corresponding loop is situated in the cavity and a portion of the corresponding loop is situated outside of the cavity.

4. The container according to claim 1, further comprising the at least one flower and at least one coupler configured to secure the at least one flower to the platform.

5. The container according to claim 4, wherein the at least one flower is at least one of a real flower, a preserved flower, and an artificial flower.

6. The container according to claim 1, wherein the platform is shaped and sized to slidably engage the at least one wall in the cavity.

7. The container according to claim 1, further comprising at least one of a cover and an inner cover configured to cover at least a portion of the cavity.

8. A container, comprising:
a platform configured to be coupled to at least one flower;
a body having at least one wall extending between a top edge and a bottom edge and defining at least a portion of a cavity configured to receive the platform, the top edge defining a first opening leading to the cavity;
at least one opening situated in the at least one wall between the top and bottom edges; and
at least one tensioner extending through a corresponding one of the at least one opening such that at least a portion of the at least one tensioner is situated in the cavity and is configured to be pulled from the cavity through the corresponding one of the at least one opening to urge at least a portion of the platform from the cavity towards or through the first opening.

9. The container according to claim 8, further comprising the at least one flower and at least one coupler configured to secure the at least one flower to the platform.

10. The container according to claim 8, further comprising a coupler to couple the at least one tensioner into a loop.

11. The container according to claim 8, wherein the platform further comprises at least one well configured to receive the at least one flower.

12. The container according to claim 8, wherein the platform is shaped and sized to slidably engage the least one wall within the cavity.

13. The container according to claim 8, further comprising at least one of a tab, a bead, a charm, and a ribbon coupled to a portion of the at least one tensioner that is outside of the cavity.

14. The container according to claim 8, further comprising at least one of a cover and an inner cover configured to cover at least a portion of the cavity.

15. A container, comprising:
a platform configured to be coupled to at least one flower;
a body having at least one wall extending between a top edge and a bottom edge and defining at least a portion of a cavity configured to receive the platform, the top edge defining a first opening leading to the cavity;
at least one opening situated in the at least one wall between the top and bottom edges; and
a tensioner extending across the cavity and through the at least one opening such that the tensioner is configured to be pulled from the cavity through the at least one opening to urge the platform from the cavity towards or through the first opening.

16. The container according to claim 15, further comprising a grommet configured to receive the tensioner in the at least one opening.

17. The container according to claim 15, wherein the platform comprises a side wall configured to slidably engage the at least one wall of the body and stabilize the platform within the cavity.

18. The container according to claim 17, wherein the platform is shaped and sized to generate friction between the side wall and the at least one wall to maintain a position of the platform relative to the body.

19. The container according to claim 15, further comprising at least one of a cover and an inner cover configured to cover at least a portion of the cavity.

* * * * *